(12) United States Patent
Taft

(10) Patent No.: US 8,918,842 B2
(45) Date of Patent: Dec. 23, 2014

(54) UTILITY GRID COMMAND FILTER SYSTEM

(75) Inventor: Jeffrey D. Taft, Canonsburg, PA (US)

(73) Assignee: Accenture Global Services Limited, Dublin (IE)

( * ) Notice: Subject to any disclaimer, the term of this patent is extended or adjusted under 35 U.S.C. 154(b) by 471 days.

(21) Appl. No.: 12/709,081

(22) Filed: Feb. 19, 2010

(65) Prior Publication Data

US 2011/0208366 A1 Aug. 25, 2011

(51) Int. Cl.
*G06F 7/04* (2006.01)
*H04L 29/06* (2006.01)
*H04L 9/32* (2006.01)
*H04L 29/08* (2006.01)
*G06F 21/62* (2013.01)
*H02J 13/00* (2006.01)
*H04L 12/24* (2006.01)

(52) U.S. Cl.
CPC ............ *H04L 63/0227* (2013.01); *H04L 63/08* (2013.01); *G06F 21/6227* (2013.01); *H04L 63/126* (2013.01); *G06F 2221/2113* (2013.01); *H04L 63/105* (2013.01); *H04L 9/3244* (2013.01); *H04L 63/14* (2013.01); *H02J 13/0079* (2013.01); *H04L 12/24* (2013.01); *H04L 29/08846* (2013.01); *H04L 41/00* (2013.01); *H04L 63/10* (2013.01); *Y04S 40/24* (2013.01)
USPC ................. 726/4; 726/26; 713/161; 713/166; 713/168

(58) Field of Classification Search
CPC ..... H04L 63/08; H04L 63/105; H04L 63/126; H04L 63/14; H04L 9/3244; G06F 21/6227; G06F 2221/2113
USPC .......................... 726/4, 26; 713/161, 166, 168
See application file for complete search history.

(56) References Cited

U.S. PATENT DOCUMENTS

| | | |
|---|---|---|
| 2004/0139134 A1 | 7/2004 | Feather, Jr. et al. |
| 2006/0184287 A1 | 8/2006 | Belady et al. |
| 2009/0034419 A1 | 2/2009 | Flammer, III et al. |
| 2009/0281673 A1 | 11/2009 | Taft |
| 2011/0039237 A1* | 2/2011 | Skare ........................... 434/118 |
| 2011/0191475 A1* | 8/2011 | Sudit ............................ 709/226 |
| 2011/0194539 A1* | 8/2011 | Blasinski et al. ............ 370/336 |
| 2011/0204719 A1* | 8/2011 | Sackman et al. ............... 307/42 |

OTHER PUBLICATIONS

Written Opinion from corresponding PCT Application No. PCT/US2011/024979 dated May 26, 2011, 15 pages.
Examination Report of corresponding Australian Application No. 2011218256 dated Jan. 22, 2013, 3 pages.
Written Opinion of corresponding Singapore Application No. 201206065-3, dated Sep. 14, 2013, 8 pages.
First Examination Report of corresponding New Zealand Application No. 601777, dated Feb. 26, 2013, 2 pages.

* cited by examiner

*Primary Examiner* — Aravind Moorthy
(74) *Attorney, Agent, or Firm* — Brinks Gilson & Lione

(57) ABSTRACT

A command filter module filters receives a plurality commands intended for receipt by devices interconnected within a utility grid. The command filter module may authorize the plurality of commands for execution by the respective devices based on predetermined set of command rules. Historical and real-time data may be implemented by the command filter module to perform an authorization decision for the plurality of commands. Authorized commands may be transmitted by the command filter module for receipt by the respective devices. The command filter module may generate rejection messages corresponding to unauthorized commands. The rejection messages may be transmitted to a source of an unauthorized command.

18 Claims, 28 Drawing Sheets

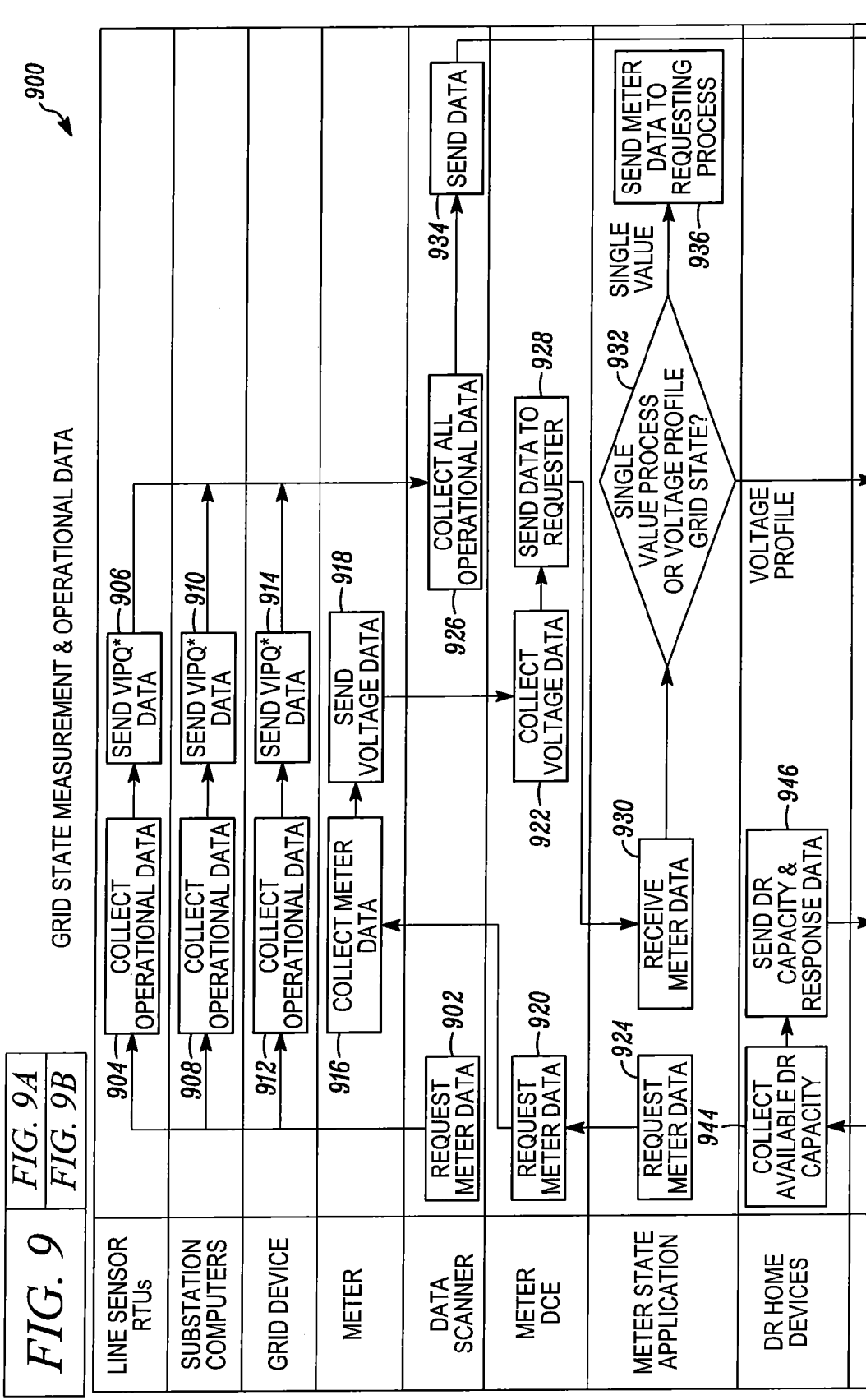

UTILITY GRID COMMAND FILTER SYSTEM

BACKGROUND

1. Field of the Invention

The present invention relates generally to a system and method for managing a power grid, and more particularly to a system for filtering utility grid device commands based on predetermined criteria.

2. Related Art

A power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as 138K Volts). From a transmission substation, smaller transmission lines (such as sub-transmission lines) transmit the intermediate voltage to distribution substations. At the distribution substations, the intermediate voltage may be again stepped down to a "medium voltage" (such as from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as 240/120V). The consumer voltage may then be used by the consumer.

One or more power companies may manage the power grid, including managing faults, maintenance, and upgrades related to the power grid. However, the management of the power grid is often inefficient and costly. For example, a power company that manages the local distribution network may manage faults that may occur in the feeder circuits or on circuits, called lateral circuits, which branch from the feeder circuits. The management of the local distribution network often relies on telephone calls from consumers when an outage occurs or relies on field workers analyzing the local distribution network.

Power companies have attempted to upgrade the power grid using digital technology, sometimes called a "smart grid." For example, more intelligent meters (sometimes called "smart meters") are a type of advanced meter that identifies consumption in more detail than a conventional meter. The smart meter may then communicate that information via some network back to the local utility for monitoring and billing purposes (telemetering). Other devices within a smart grid may also be controlled via remote terminals. Allowing devices within a smart grid allows electronic control over devices via commands on a very resolute scale, such as a major appliance in a residential customer home or major industrial equipment of an industrial customer. While single commands of this nature are not by themselves dangerous to the overall health of a smart grid, many of these commands executed within a relatively short amount of time may cause adverse effects within the smart grid.

BRIEF SUMMARY

A command filter system to filter device commands within a utility grid is provided. The command filter system may be implemented in a smart grid for improving the management of a power utility grid. The smart grid as presently disclosed includes using sensors in various portions of the power utility grid, using communications and computing technology to upgrade the current electric power grid so that it can operate more efficiently and reliably and support additional services to consumers. The smart grid as presently disclosed may upgrade a traditional electricity transmission and distribution network or "grid," such as by using robust two-way communications, advanced sensors, and distributed computers (including additional intelligence in the electric power transmission and/or electricity distribution). The smart grid may further include additional functionality at a central management facility in order to manage operations, detect and correct faults, manage resources, etc.

Commands used to control various devices within the smart grid may be generated manually or automatically. The command filter system may be implemented within the smart grid to analyze each device commands and authorize the device commands for execution by a particular device. The command filter system may receive each device command within the smart grid. The command filter system may apply a set of rules to the device commands. Based on application of the set of rules, the command filter system may authorize commands for execution by the particular devices. The command filter system may also prevent commands from being executed by the particular devices. A rejection message may be generated by the command filter system for each command prevented from being executed. Each rejection message may be transmitted to an origination source of the rejected command or to a supervisory location for subsequent intervention.

The command filter system may implement various predetermined rules to determine if authorization should be given for various commands. The command filter system may analyze commands received simultaneously or within predetermined windows of time. Predetermined rules may be directed toward the number or type of commands received. The command filter system may retrieve historical data associated with the smart grid as well as current operating conditions for use in analysis. Based on historical data, the command filter system may perform an authorization decision on a particular command or group of commands. Using current operating conditions in conjunction with the historical data, the command filter system may predict an effect on the smart grid of executing one or more commands being considered for authorization. The predetermined rules may be applied to the predicted effect to determine whether or not the commands should be authorized.

The command filter system may be implemented in smart grids having various configurations. The command filter may be implemented by software buses within the smart grad, such as communication network buses or grid-event-recognition buses. The command filter may relay authorized commands directly to devices or may be relay the commands through communication networks and sub-networks. The command filter system may be a single system configured to receive substantially all device commands directed through the smart grid. In other configurations, the command filter system may be distributed within the smart grid, so the each distributed command filter system is responsible for analyzing commands associated with specific types of devices.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE DRAWINGS AND THE PRESENTLY PREFERRED EMBODIMENTS

By way of overview, the preferred embodiments described below relate to a command filter system. The command filter system may receive command intended to control operation of various devices within a power grid. The command filter may apply one or more rules to the commands to determine if the commands should be authorized for execution by the devices intended for receipt.

INDE High Level Architecture Description

Overall Architecture

Figure 1A:
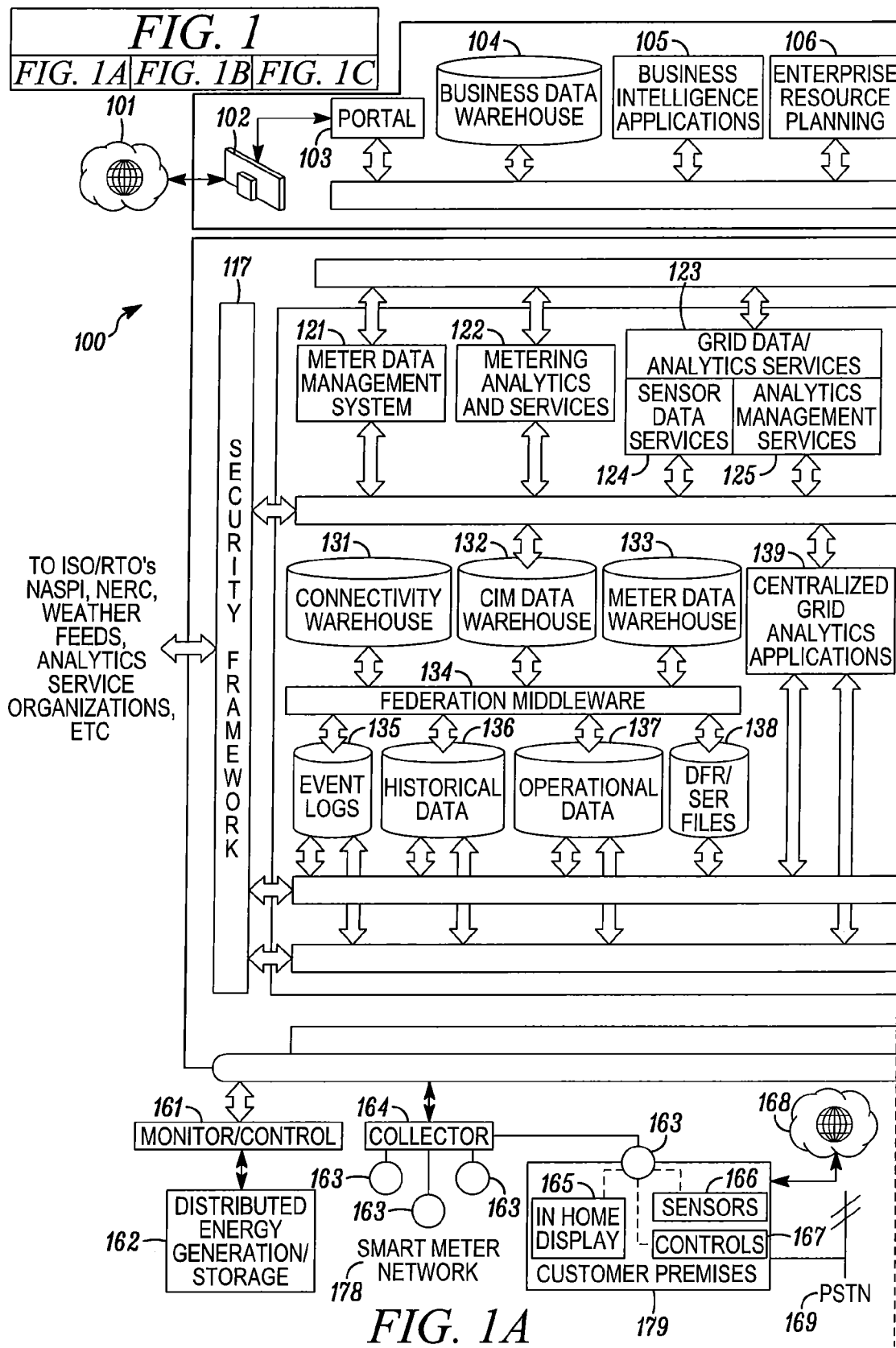
FIG. 1 is a block diagram of one example of the overall architecture for a power grid.
Figure 1B:
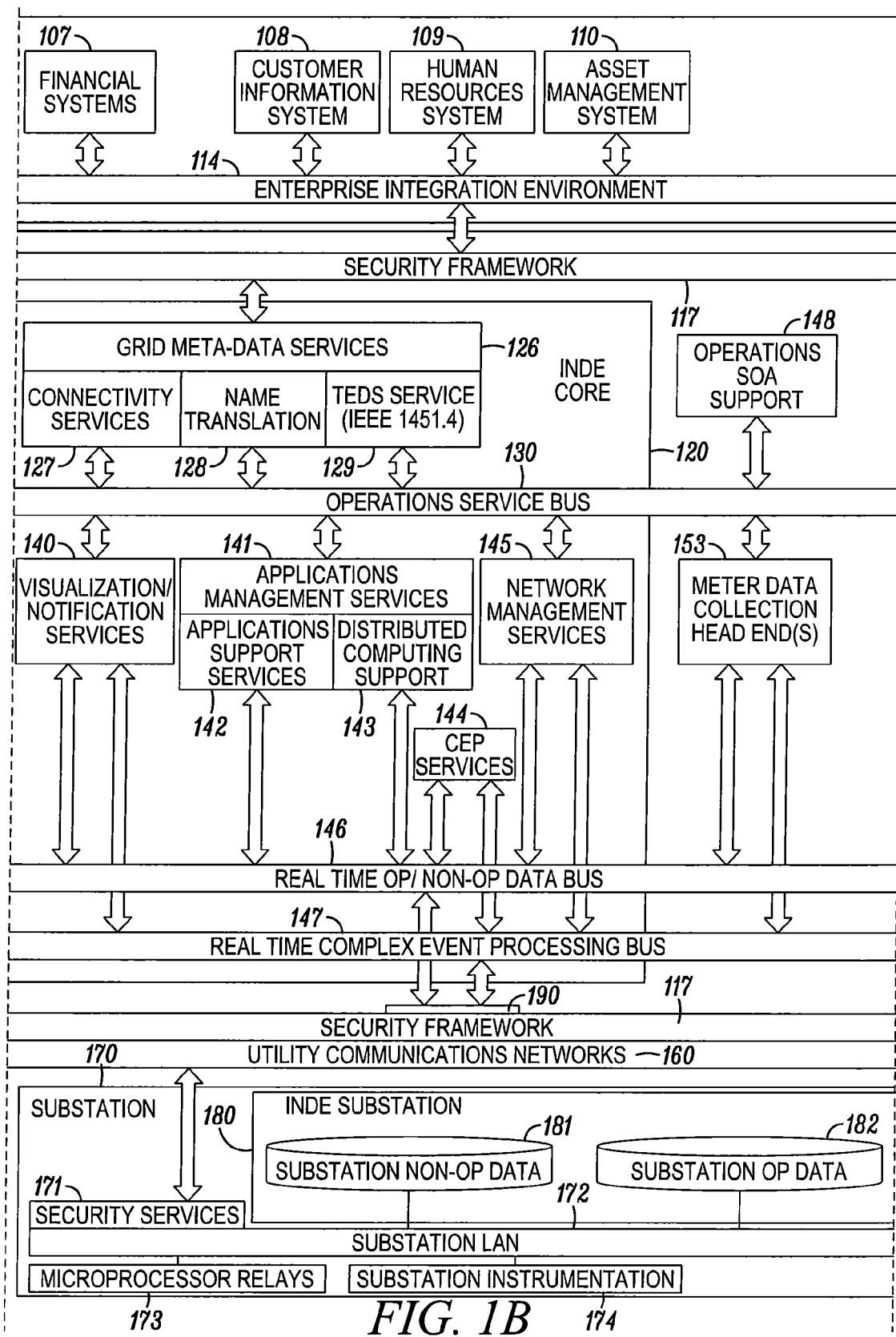
Figure 1C:
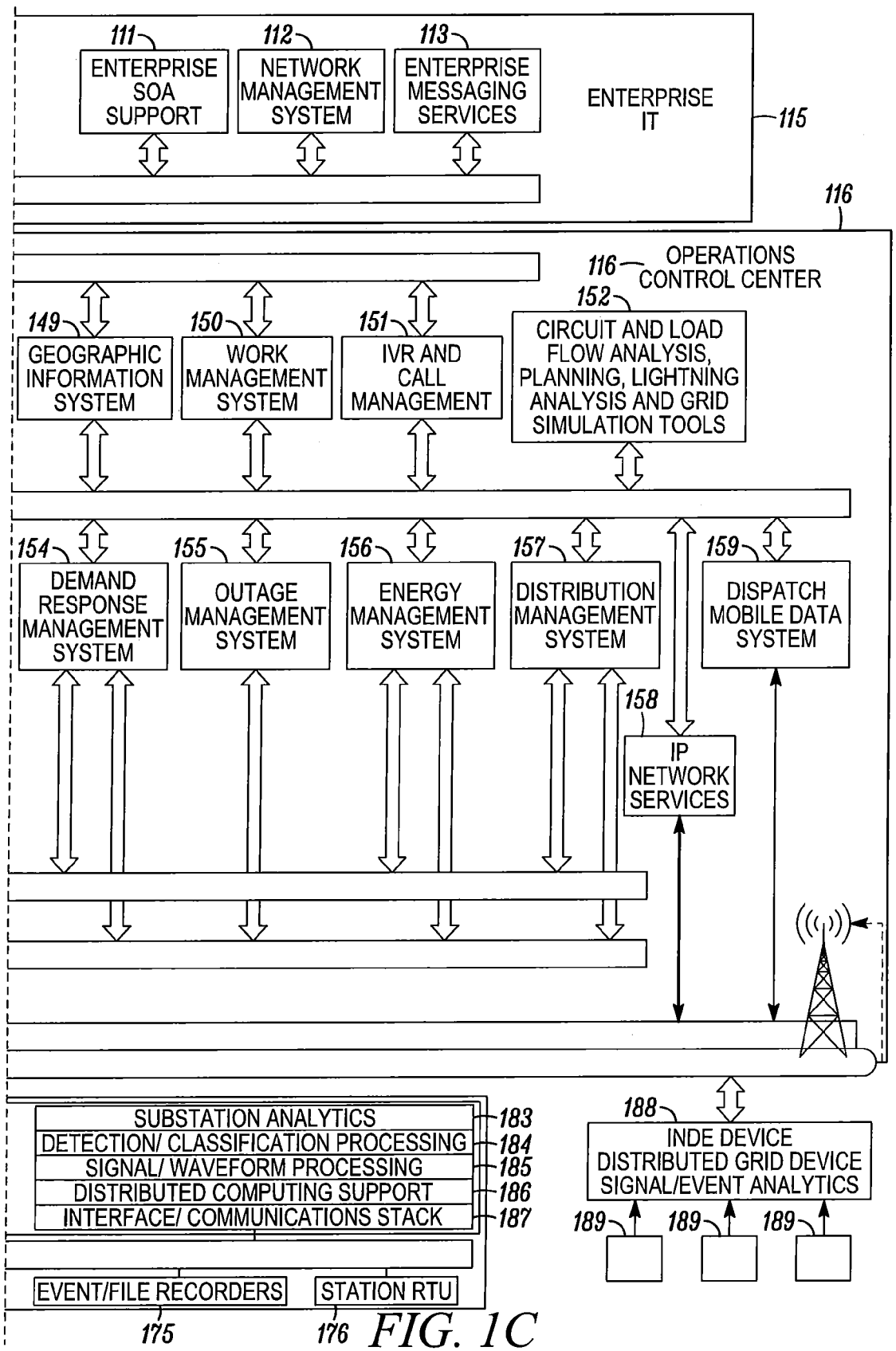

Turning to the drawings, wherein like reference numerals refer to like elements, FIG. 1 illustrates one example of the overall architecture for INDE. This architecture may serve as a reference model that provides for end to end collection, transport, storage, and management of smart grid data; it may also provide analytics and analytics management, as well as integration of the forgoing into utility processes and systems. Hence, it may be viewed as an enterprise-wide architecture. Certain elements, such as operational management and aspects of the grid itself, are discussed in more detail below.

The architecture depicted in FIG. 1 may include up to four data and integration buses: (1) a high speed sensor data bus 146 (which may include operational and non-operational data); (2) a dedicated event processing bus 147 (which may include event data); (3) an operations service bus 130 (which may serve to provide information about the smart grid to the utility back office applications); and (4) an enterprise service bus for the back office IT systems (shown in FIG. 1 as the enterprise integration environment bus 114 for serving enterprise IT 115). The separate data buses may be achieved in one or more ways. For example, two or more of the data buses, such as the high speed sensor data bus 146 and the event processing bus 147, may be different segments in a single data bus. Specifically, the buses may have a segmented structure or platform. As discussed in more detail below, hardware and/or software, such as one or more switches, may be used to route data on different segments of the data bus.

As another example, two or more of the data buses may be on separate buses, such as separate physical buses in terms of the hardware needed to transport data on the separate buses. Specifically, each of the buses may include cabling separate from each other. Further, some or all of the separate buses may be of the same type. For example, one or more of the buses may comprise a local area network (LAN), such as Ethernet® over unshielded twisted pair cabling and Wi-Fi. As discussed in more detail below, hardware and/or software, such as a router, may be used to route data on data onto one bus among the different physical buses.

As still another example, two or more of the buses may be on different segments in a single bus structure and one or more buses may be on separate physical buses. Specifically, the high speed sensor data bus 146 and the event processing bus 147 may be different segments in a single data bus, while the enterprise integration environment bus 114 may be on a physically separate bus.

Though FIG. 1 depicts four buses, fewer or greater numbers of buses may be used to carry the four listed types of data. For example, a single unsegmented bus may be used to communicate the sensor data and the event processing data (bringing the total number of buses to three), as discussed below. And, the system may operate without the operations service bus 130 and/or the enterprise integration environment bus 114.

The IT environment may be SOA-compatible. Service Oriented Architecture (SOA) is a computer systems architectural style for creating and using business processes, packaged as services, throughout their lifecycle. SOA also defines and provisions the IT infrastructure to allow different applications to exchange data and participate in business processes. Although, the use of SOA and the enterprise service bus are optional.

The figures illustrate different elements within the overall architecture, such as the following: (1) INDE CORE 120; (2) INDE SUBSTATION 180; and (3) INDE DEVICE 188. This division of the elements within the overall architecture is for illustration purposes. Other division of the elements may be used. The INDE architecture may be used to support both distributed and centralized approaches to grid intelligence, and to provide mechanisms for dealing with scale in large implementations.

The INDE Reference Architecture is one example of the technical architecture that may be implemented. For example, it may be an example of a meta-architecture, used to provide a starting point for developing any number of specific technical architectures, one for each utility solution, as discussed below. Thus, the specific solution for a particular utility may include one, some, or all of the elements in the INDE Reference Architecture. And, the INDE Reference Architecture may provide a standardized starting point for solution development. Discussed below is the methodology for determining the specific technical architecture for a particular power grid.

The INDE Reference Architecture may be an enterprise wide architecture. Its purpose may be to provide the framework for end to end management of grid data and analytics and integration of these into utility systems and processes. Since smart grid technology affects every aspect of utility business processes, one should be mindful of the effects not just at the grid, operations, and customer premise levels, but also at the back office and enterprise levels. Consequently the INDE Reference Architecture can and does reference enterprise level SOA, for example, in order to support the SOA environment for interface purposes. This should not be taken as a requirement that a utility must convert their existing IT environment to SOA before a smart grid can be built and used. An enterprise service bus is a useful mechanism for facilitating IT integration, but it is not required in order to implement the rest of the smart grid solution. The discussion below focuses on different components of the INDE smart grid elements.

INDE Component Groups

As discussed above, the different components in the INDE Reference Architecture may include, for example: (1) INDE CORE 120; (2) INDE SUBSTATION 180; and (3) INDE DEVICE 188. The following sections discuss these three example element groups of the INDE Reference Architecture and provide descriptions of the components of each group.

INDE CORE

Figure 2:
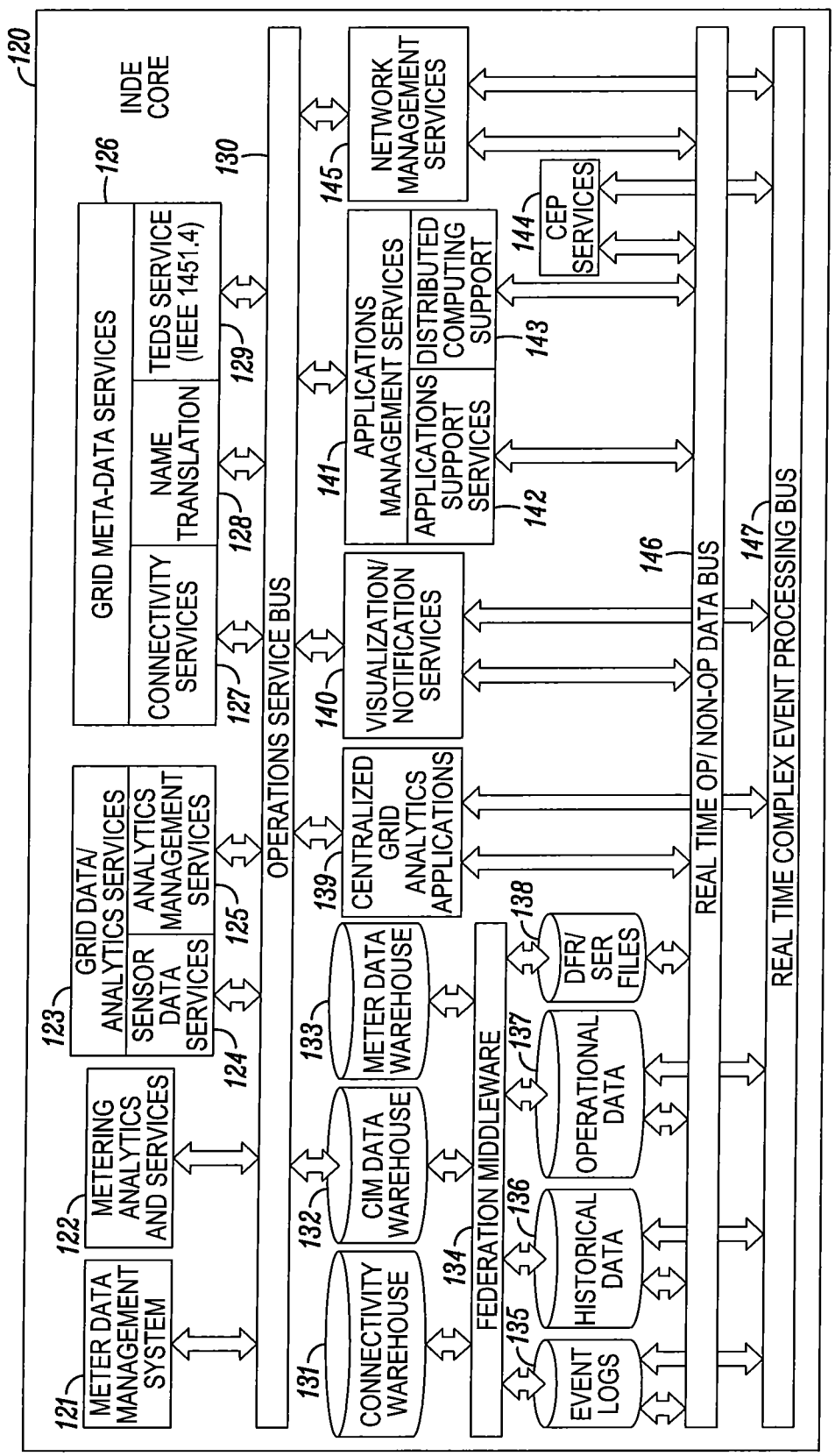
FIG. 2 is a block diagram of the INDE CORE depicted in FIG. 1.

FIG. 2 illustrates the INDE CORE 120, which is the portion of INDE Reference Architecture that may reside in an operations control center, as shown in FIG. 1. The INDE CORE 120 may contain a unified data architecture for storage of grid data and an integration schema for analytics to operate on that data. This data architecture may use the International Electrotechnical Commission (IEC) Common Information Model (CIM) as its top level schema. The IEC CIM is a standard developed by the electric power industry that has been officially adopted by the IEC, aiming to allow application software to exchange information about the configuration and status of an electrical network.

In addition, this data architecture may make use of federation middleware 134 to connect other types of utility data (such as, for example, meter data, operational and historical data, log and event files), and connectivity and meta-data files into a single data architecture that may have a single entry point for access by high level applications, including enterprise applications. Real time systems may also access key data stores via the high speed data bus and several data stores can receive real time data. Different types of data may be transported within one or more buses in the smart grid. As discussed below in the INDE SUBSTATION 180 section, substation data may be collected and stored locally at the substation. Specifically, a database, which may be associated with and proximate to the substation, may store the substation data. Analytics pertaining to the substation level may also be performed at the substation computers and stored at the substation database, and all or part of the data may be transported to the control center.

The types of data transported may include operation and non-operational data, events, grid connectivity data, and network location data. Operational data may include, but is not limited to, switch state, feeder state, capacitor state, section state, meter state, FCI state, line sensor state, voltage, current, real power, reactive power, etc. Non-operational data may include, but is not limited to, power quality, power reliability, asset health, stress data, etc. The operational and non-operational data may be transported using an operational/non-operational data bus 146. Data collection applications in the electric power transmission and/or electricity distribution of the power grid may be responsible for sending some or all of the data to the operational/non-operational data bus 146. In this way, applications that need this information may be able to get the data by subscribing to the information or by invoking services that may make this data available.

Events may include messages and/or alarms originating from the various devices and sensors that are part of the smart grid, as discussed below. Events may be directly generated from the devices and sensors on the smart grid network as well as generated by the various analytics applications based on the measurement data from these sensors and devices. Examples of events may include meter outage, meter alarm, transformer outage, etc. Grid components like grid devices (smart power sensors (such as a sensor with an embedded processor that can be programmed for digital processing capability) temperature sensors, etc.), power system components that includes additional embedded processing (RTUs, etc), smart meter networks (meter health, meter readings, etc), and mobile field force devices (outage events, work order completions, etc) may generate event data, operational and non-operational data. The event data generated within the smart grid may be transmitted via an event bus 147.

Grid connectivity data may define the layout of the utility grid. There may be a base layout which defines the physical layout of the grid components (sub stations, segments, feeders, transformers, switches, reclosers, meters, sensors, utility poles, etc) and their inter-connectivity at installation. Based on the events within the grid (component failures, maintenance activity, etc), the grid connectivity may change on a continual basis. As discussed in more detail below, the structure of how the data is stored as well as the combination of the data enable the historical recreation of the grid layout at various past times. Grid connectivity data may be extracted from the Geographic Information System (GIS) on a periodic basis as modifications to the utility grid are made and this information is updated in the GIS application.

Network location data may include the information about the grid component on the communication network. This information may be used to send messages and information to the particular grid component. Network location data may be either entered manually into the Smart Grid database as new Smart Grid components are installed or is extracted from an Asset Management System if this information is maintained electronically.

As discussed in more detail below, data may be sent from various components in the grid (such as INDE SUBSTATION 180 and/or INDE DEVICE 188). The data may be sent to the INDE CORE 120 wirelessly, wired, or a combination of both. The data may be received by utility communications networks 160, which may send the data to routing device 190. Routing device 190 may comprise software and/or hardware for managing routing of data onto a segment of a bus (when the bus comprises a segmented bus structure) or onto a separate bus. Routing device may comprise one or more switches or a router. Routing device 190 may comprise a networking device whose software and hardware routes and/or forwards the data to one or more of the buses. For example, the routing device 190 may route operational and non-operational data to the operational/non-operational data bus 146. The router may also route event data to the event bus 147.

The routing device 190 may determine how to route the data based on one or more methods. For example, the routing device 190 may examine one or more headers in the transmitted data to determine whether to route the data to the segment for the operational/non-operational data bus 146 or to the segment for the event bus 147. Specifically, one or more headers in the data may indicate whether the data is operation/non-operational data (so that the routing device 190 routes the data to the operational/non-operational data bus 146) or whether the data is event data (so that the routing device 190 routes the event bus 147). Alternatively, the routing device 190 may examine the source of the data or the payload of the data to determine the type of data (e.g., the routing device 190 may examine the format of the data to determine if the data is operational/non-operational data or event data).

One of the stores, such as the operational data warehouse 137 that stores the operational data, may be implemented as true distributed database. Another of the stores, the historian (identified as historical data 136 in FIGS. 1 and 2), may be implemented as a distributed database. The other "ends" of these two databases may be located in the INDE SUBSTATION 180 group (discussed below). Further, events may be stored directly into any of several data stores via the complex event processing bus. Specifically, the events may be stored in event logs 135, which may be a repository for all the events that have published to the event bus 147. The event log may store one, some, or all of the following: event id; event type; event source; event priority; and event generation time. The event bus 147 need not store the events long term, providing the persistence for all the events.

The storage of the data may be such that the data may be as close to the source as possible or practicable. In one implementation, this may include, for example, the substation data being stored at the INDE SUBSTATION 180. But this data may also be required at the operations control center level 116 to make different types of decisions that consider the grid at a much granular level. In conjunction with a distributed intelligence approach, a distributed data approach may be been adopted to facilitate data availability at all levels of the solution through the use of database links and data services as applicable. In this way, the solution for the historical data store (which may be accessible at the operations control center level 116) may be similar to that of the operational data store. Data may be stored locally at the substation and database links configured on the repository instance at the control center, provide access to the data at the individual substations. Substation analytics may be performed locally at the substation using the local data store. Historical/collective analytics may be performed at the operations control center level 116 by accessing data at the local substation instances using the database links. Alternatively, data may be stored centrally at the INDE CORE 120. However, given the amount of data that may need to be transmitted from the INDE DEVICES 188, the storage of the data at the INDE DEVICES 188 may be preferred. Specifically, if there are thousands or tens of thousands of substations (which may occur in a power grid), the amount of data that needs to be transmitted to the INDE CORE 120 may create a communications bottleneck.

Finally, the INDE CORE 120 may program or control one, some or all of the INDE SUBSTATION 180 or INDE DEVICE 188 in the power grid (discussed below). For example, the INDE CORE 120 may modify the programming (such as download an updated program) or provide a control command to control any aspect of the INDE SUBSTATION 180 or INDE DEVICE 188 (such as control of the sensors or analytics). Other elements, not shown in FIG. 2, may include various integration elements to support this logical architecture.

Table 1 describes the certain elements of INDE CORE 120 as depicted in FIG. 2.

TABLE 1

INDE CORE Elements

| INDE CORE Element | Description |
| --- | --- |
| CEP Services 144 | Provides high speed, low latency event stream processing, event filtering, and multi-stream event correlation |
| Centralized Grid Analytics Applications 139 | May consist of any number of commercial or custom analytics applications that are used in a non-real time manner, primarily operating from the data stores in CORE |
| Visualization/Notification Services 140 | Support for visualization of data, states and event streams, and automatic notifications based on event triggers |
| Application Management Services 141 | Services (such as Applications Support Services 142 and Distributed Computing Support 143) that support application launch and execution, web services, and support for distributed computing and automated remote program download (e.g., OSGi) |
| Network Management Services 145 | Automated monitoring of communications networks, applications and databases; system health monitoring, failure root cause analysis (non-grid) |
| Grid Meta-Data Services 126 | Services (such as Connectivity Services 127, Name Translation 128, and TEDS Service 129) for storage, retrieval, and update of system meta-data, including grid and communication/sensor net connectivity, point lists, sensor calibrations, protocols, device set points, etc |
| Grid Data/Analytics Services 123 | Services (such as Sensor Data Services 124 and Analytics Management Services 125) to support access to grid data and grid analytics; management of analytics |
| Meter Data Management System 121 | Meter data management system functions (e.g., Lodestar) |

TABLE 1-continued

INDE CORE Elements

| INDE CORE Element | Description |
| --- | --- |
| AMOS Meter Data Services | See discussion below |
| Real Time Complex Event Processing Bus 147 | Message bus dedicated to handling event message streams - purpose of a dedicated bus it to provide high bandwidth and low latency for highly bursty event message floods. The event message may be in the form of XML message. Other types of messages may be used.<br>Events may be segregated from operational/non-operational data, and may be transmitted on a separate or dedicated bus. Events typically have higher priority as they usually require some immediate action from a utility operational perspective (messages from defective meters, transformers, etc)<br>The event processing bus (and the associated event correlation processing service depicted in FIG. 1) may filter floods of events down into an interpretation that may better be acted upon by other devices. In addition, the event processing bus may take multiple event streams, find various patterns occurring across the multiple event streams, and provide an interpretation of multiple event streams. In this way, the event processing bus may not simply examine the event data from a single device, instead looking at multiple device (including multiple classes of devices that may be seemingly unrelated) in order to find correlations. The analysis of the single or multiple event streams may be rule based |
| Real Time Op/Non-Op Data Bus 146 | Operational data may include data reflecting the current state of the electrical state of the grid that may be used in grid control (e.g., currents, voltages, real power, reactive power, etc.). Non-operational data may include data reflecting the "health" or condition of a device.<br>Operational data has previously been transmitted directly to a specific device (thereby creating a potential "silo" problem of not making the data available to other devices or other applications). For example, operational data previously was transmitted to the SCADA (Supervisory Control And Data Acquisition) system for grid management (monitor and control grid). However, using the bus structure, the operational data may also be used for load balancing, asset utilization/optimization, system planning, etc., as discussed for example in FIGS. 10-19.<br>Non-operational data was previously obtained by sending a person in the field to collect the operational data (rather than automatically sending the non-operational data to a central repository).<br>Typically, the operational and non-operational data are generated in the various devices in the grid at predetermined times. This is in contrast to the event data, which typically is generated in bursts, as discussed below.<br>A message bus may be dedicated to handling streams of operational and non-operational data from substations and grid devices.<br>The purpose of a dedicated bus may be to provide constant low latency through put to match the data flows; as discussed elsewhere, a single bus may be used for transmission of both the operation and non-operational data and the event processing data in some circumstances (effectively combining the operation/non-operational data bus with the event processing bus). |
| Operations Service Bus 130 | Message bus that supports integration of typical utility operations applications (EMS (energy management system), DMS (distribution management system), OMS (outage management system), GIS (geographic information system), dispatch) with newer smart grid functions and systems (DRMS (demand response management system), external analytics, CEP, visualization). The various buses, including the Operation/Non-operational Data bus 146, the Event data bus 147, |

TABLE 1-continued

INDE CORE Elements

| INDE CORE Element | Description |
|---|---|
| | and the operations Service Bus 130 may obtain weather feeds, etc. via a security framework 117. The operations service bus 130 may serve as the provider of information about the smart grid to the utility back office applications, as shown in FIG. 1. The analytics applications may turn the raw data from the sensors and devices on the grid into actionable information that will be available to utility applications to perform actions to control the grid. Although most of the interactions between the utility back office applications and the INDE CORE 120 is expected to occur thru this bus, utility applications will have access to the other two buses and will consume data from those buses as well (for example, meter readings from the op/non-op data bus 146, outage events from the event bus 147) |
| CIM Data Database 132 | Top level data store for the organization of grid data; uses the IEC CIM data schema; provides the primary contact point for access to grid data from the operational systems and the enterprise systems. Federation Middleware allow communication to the various databases. |
| Connectivity Datamart 131 | The connectivity datamart 131 may contain the electrical connectivity information of the components of the grid. This information may be derived from the Geographic Information System (GIS) of the utility which holds the as built geographical location of the components that make up the grid. The data in the connectivity warehouse 131 may describe the hierarchical information about all the components of the grid (substation, feeder, section, segment, branch, t-section, circuit breaker, recloser, switch, etc - basically all the assets). The connectivity datamart 131 may have the asset and connectivity information as built. Thus, the connectivity datamart 131 may comprise the asset database that includes all the devices and sensors attached to the components of the grid. |
| Meter Data Repository 133 | The meter data repository 133 may provide rapid access to meter usage data for analytics. This repository may hold all the meter reading information from the meters at customer premises. The data collected from the meters may be stored in meter data repository 133 and provided to other utility applications for billing (or other back-office operations) as well as other analysis. |
| Event Logs 135 | Collection of log files incidental to the operation of various utility systems. The event logs 135 may be used for post mortem analysis of events and for data mining |
| Historical Data 136 | Telemetry data archive in the form of a standard data historian. Historical data 136 may hold the time series non-operational data as well as the historical operational data. Analytics pertaining to items like power quality, reliability, asset health, etc may be performed using data in historical data 136. Additionally, as discussed below, historical data 136 may be used to derive the topology of the grid at any point in time by using the historical operational data in this repository in conjunction with the as-built grid topology stored in the connectivity data mart. Further, the data may be stored as a flat record, as discussed below. |
| Operational Data 137 | Operational Data 137 may comprise a real time grid operational database. Operational Data 137 may be built in true distributed form with elements in the substations (with links in Operational Data 137) as well as the Operations center. Specifically, the Operational Data 137 may hold data measurements obtained from the sensors and devices attached to the grid components. Historical data measurements are not held in this data store, instead being held in historical data 136. The data base tables in the Operational Data 137 may be updated with the latest measurements obtained from these sensors and devices. |

TABLE 1-continued

INDE CORE Elements

| INDE CORE Element | Description |
|---|---|
| DFR/SER Files 138 | Digital fault recorder and serial event recorder files; used for event analysis and data mining; files generally are created in the substations by utility systems and equipment |

Figure 3A:
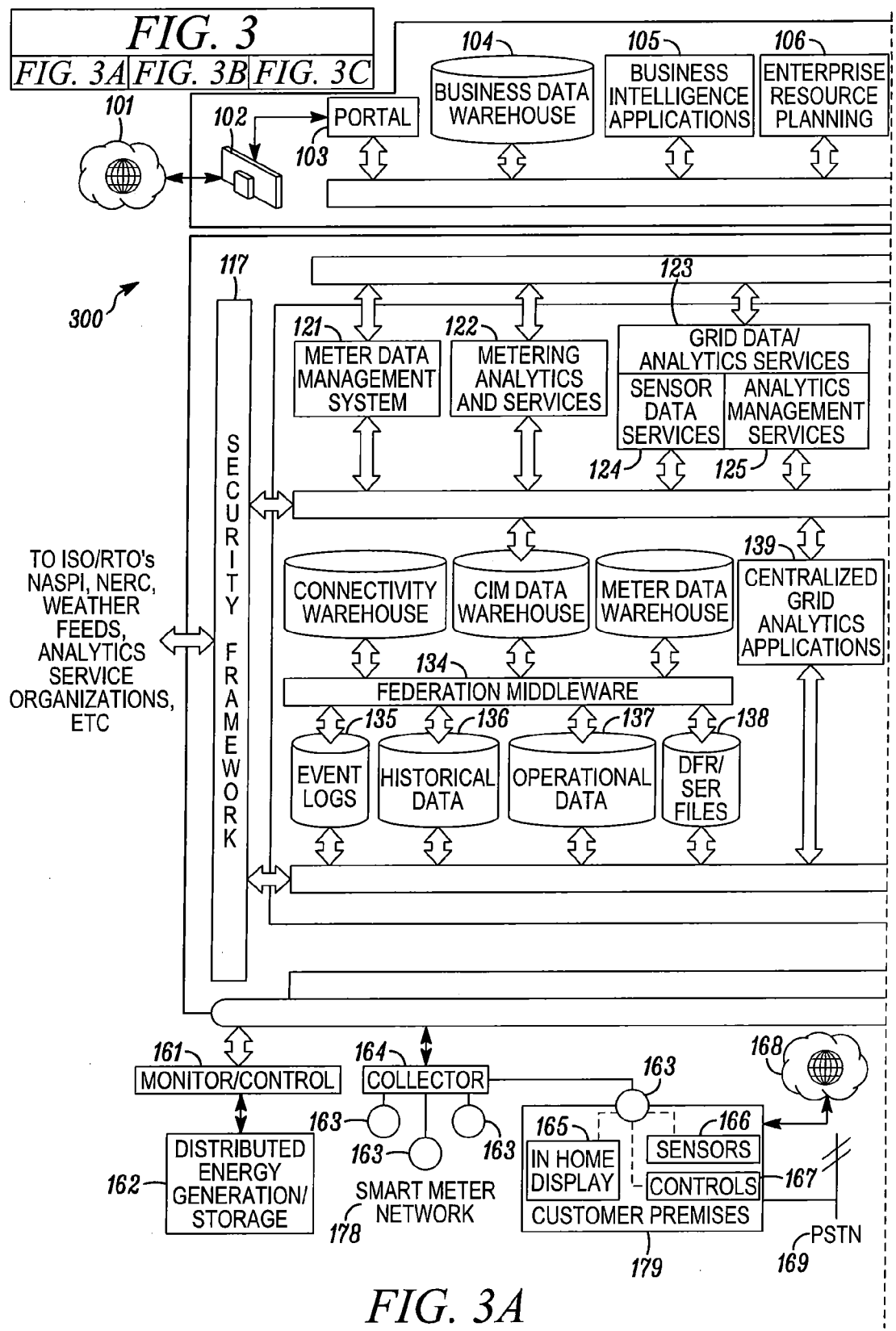
FIG. 3 is a block diagram of another example of the overall architecture for a power grid.
Figure 3B:
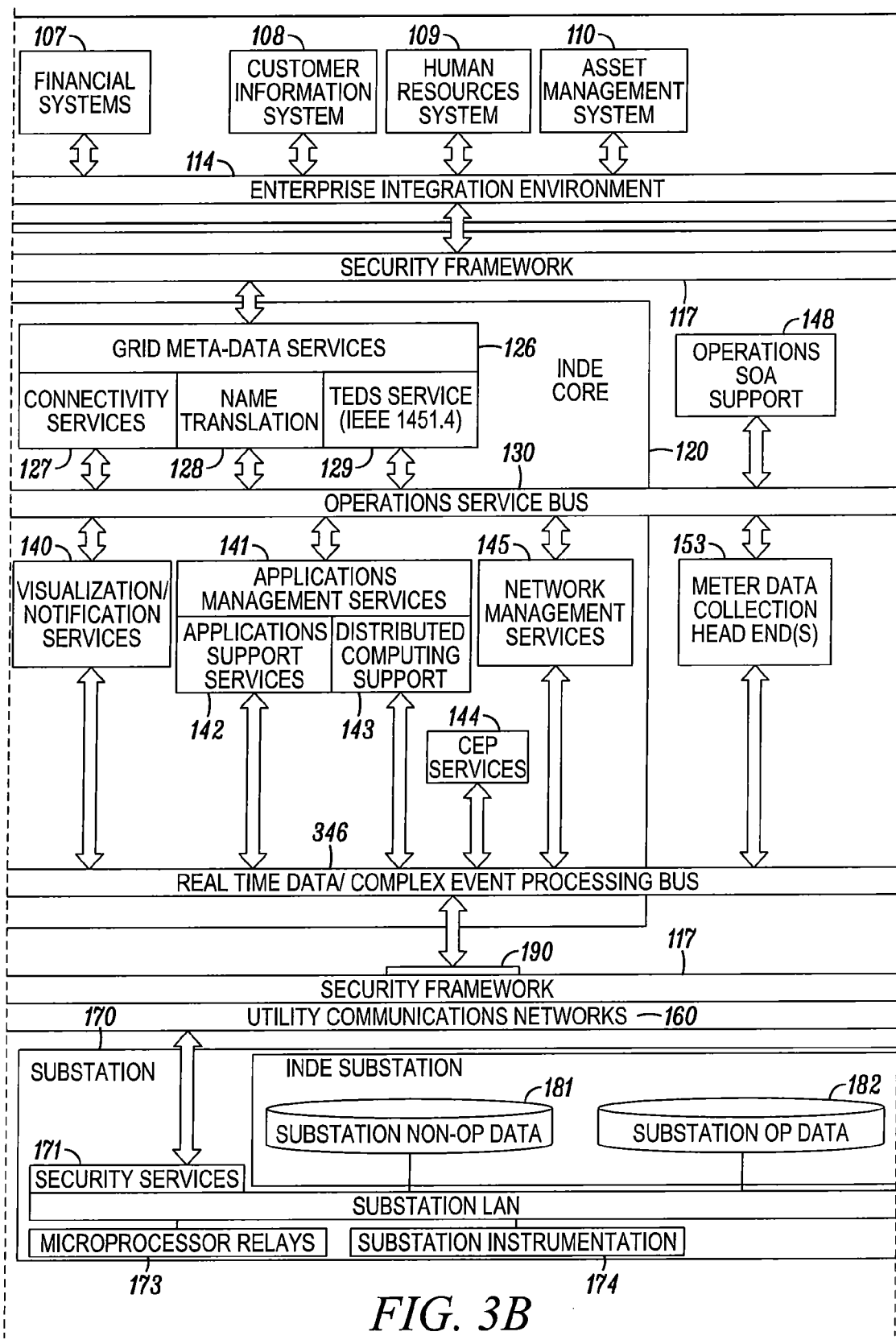
Figure 3C:
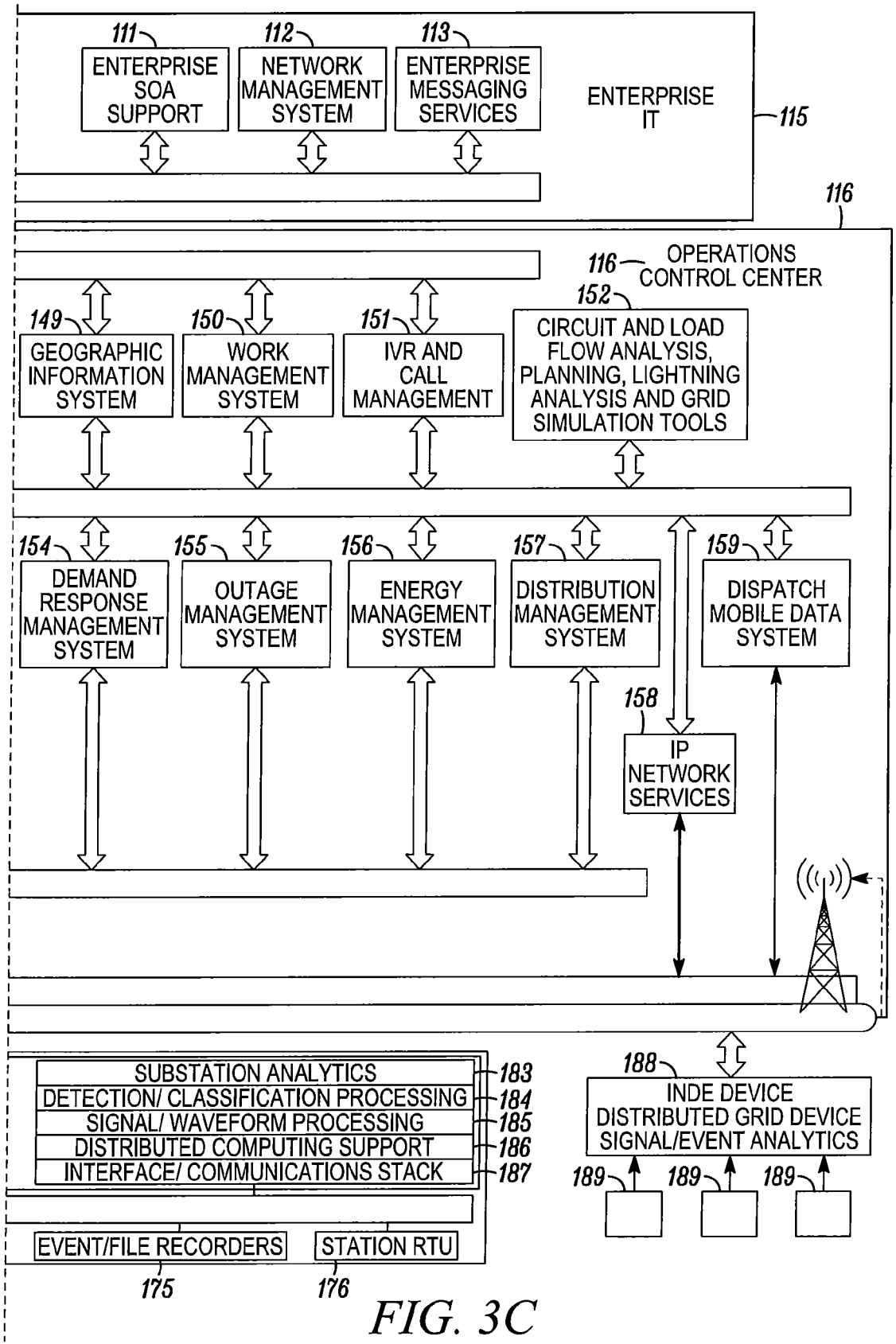

As discussed in Table 1, the real time data bus 146 (which communicates the operation and non-operational data) and the real time complex event processing bus 147 (which communicates the event processing data) into a single bus 346. An example of this is illustrated in the block diagram 300 in FIG. 3.

As shown in FIG. 1, the buses are separate for performance purposes. For CEP processing, low latency may be important for certain applications which are subject to very large message bursts. Most of the grid data flows, on the other hand, are more or less constant, with the exception of digital fault recorder files, but these can usually be retrieved on a controlled basis, whereas event bursts are asynchronous and random.

FIG. 1 further shows additional elements in the operations control center 116 separate from the INDE CORE 120. Specifically, FIG. 1 further shows Meter Data Collection Head End(s) 153, a system that is responsible for communicating with meters (such as collecting data from them and providing the collected data to the utility). Demand Response Management System 154 is a system that communicates with equipment at one or more customer premises that may be controlled by the utility. Outage Management System 155 is a system that assists a utility in managing outages by tracking location of outages, by managing what is being dispatched, and by how they are being fixed. Energy Management System 156 is a transmission system level control system that controls the devices in the substations (for example) on the transmission grid. Distribution Management System 157 is a distribution system level control system that controls the devices in the substations and feeder devices (for example) for distribution grids. IP Network Services 158 is a collection of services operating on one or more servers that support IP-type communications (such as TCP/IP, SNMP, DHCP and FTP). Dispatch Mobile Data System 159 is a system that transmits/receives messages to mobile data terminals in the field. Circuit & Load Flow Analysis, Planning, Lightning Analysis and Grid Simulation Tools 152 are a collection of tools used by a utility in the design, analysis and planning for grids. IVR (integrated voice response) and Call Management 151 are systems to handle customer calls (automated or by attendants). Incoming telephone calls regarding outages may be automatically or manually entered and forwarded to the Outage Management System 155. Work Management System 150 is a system that monitors and manages work orders. Geographic Information System 149 is a database that contains information about where assets are located geographically and how the assets are connected together. If the environment has a Services Oriented Architecture (SOA), Operations SOA Support 148 is a collection of services to support the SOA environment.

One or more of the systems in the Operations Control Center 116 that are outside of the INDE CORE 120 are legacy product systems that a utility may have. Examples of these legacy product systems include the Operations SOA Support 148, Geographic Information System 149, Work Management System 150, Call Management 151, Circuit & Load Flow Analysis, Planning, Lightning Analysis and Grid Simulation Tools 152, Meter Data Collection Head End(s) 153, Demand Response Management System 154, Outage Management System 155, Energy Management System 156, Distribution Management System 157, IP Network Services 158, and Dispatch Mobile Data System 159. However, these legacy product systems may not be able to process or handle data that is received from a smart grid. The INDE CORE 120 may be able to receive the data from the smart grid, process the data from the smart grid, and transfer the processed data to the one or more legacy product systems in a fashion that the legacy product systems may use (such as particular formatting particular to the legacy product system). In this way, the INDE CORE 120 may be viewed as a middleware.

The operations control center 116, including the INDE CORE 120, may communicate with the Enterprise IT 115. Generally speaking, the functionality in the Enterprise IT 115 comprises back-office operations. Specifically, the Enterprise IT 115 may use the enterprise integration environment bus 114 to send data to various systems within the Enterprise IT 115, including Business Data Warehouse 104, Business Intelligence Applications 105, Enterprise Resource Planning 106, various Financial Systems 107, Customer Information System 108, Human Resource System 109, Asset Management System 110, Enterprise SOA Support 111, Network Management System 112, and Enterprise Messaging Services 113. The Enterprise IT 115 may further include a portal 103 to communicate with the Internet 101 via a firewall 102.

INDE SUBSTATION

Figure 4:
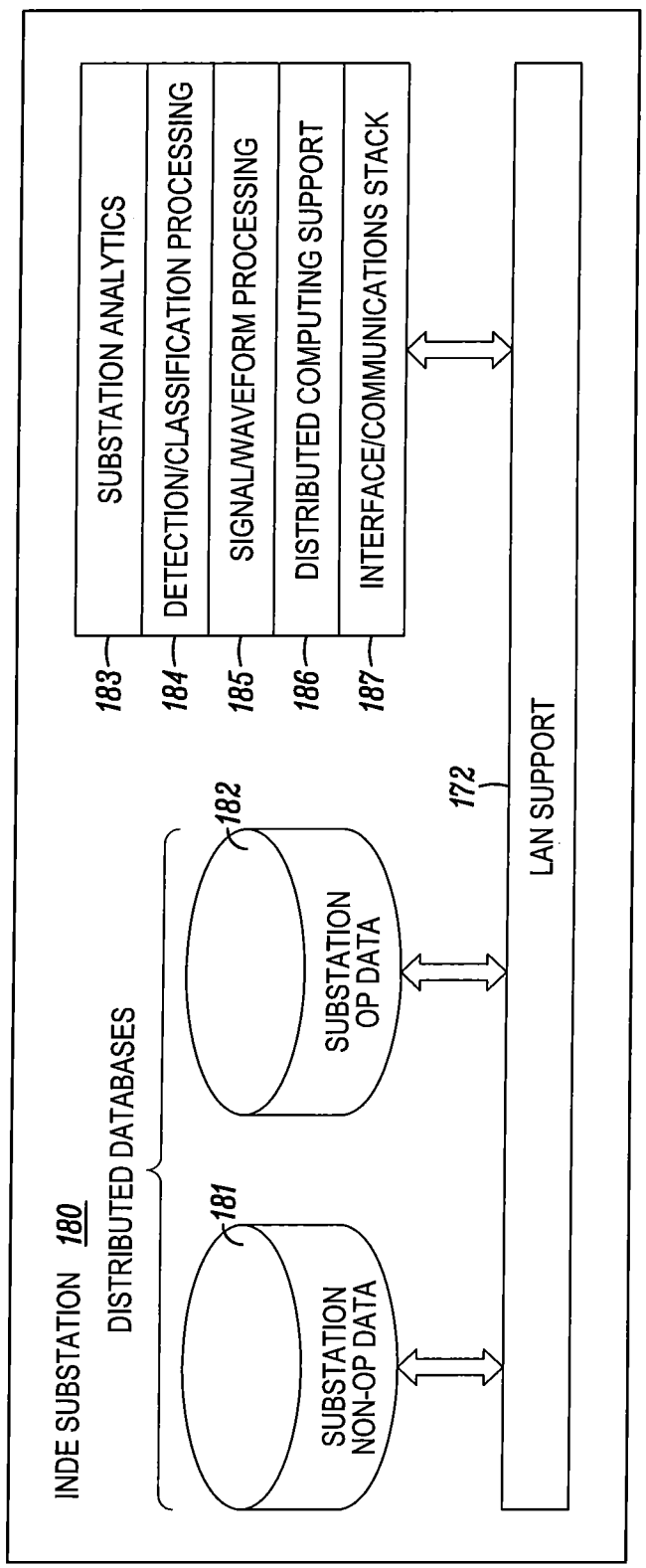
FIG. 4 is a block diagram of the INDE SUBSTATION depicted in FIGS. 1 and 3.

FIG. 4 illustrates an example of the high level architecture for the INDE SUBSTATION 180 group. This group may comprise elements that are actually hosted in the substation 170 at a substation control house on one or more servers co-located with the substation electronics and systems.

Table 2 below lists and describes certain INDE SUBSTATION 180 group elements. Data security services 171 may be a part of the substation environment; alternatively, they may be integrated into the INDE SUBSTATION 180 group.

TABLE 2

INDE SUBSTATION Elements

| INDE SUBSTATION ELEMENTS | Description |
|---|---|
| Non-Operational Data Store 181 | Performance and health data; this is a distributed data historian component |
| Operational Data Store 182 | Real time grid state data; this is part of a true distributed database |

TABLE 2-continued

INDE SUBSTATION Elements

| INDE SUBSTATION ELEMENTS | Description |
| --- | --- |
| Interface/Communications Stack 187 | Support for communications, including TCP/IP, SNMP, DHCP, SFTP, IGMP, ICMP, DNP3, IEC 61850, etc. |
| Distributed/remote computing support 186 | Support for remote program distribution, inter-process communication, etc. (DCE, JINI, OSGi for example) |
| Signal/Waveform Processing 185 | Support for real time digital signal processing components; data normalization; engineering units conversions |
| Detection/Classification Processing 184 | Support for real time event stream processing, detectors and event/waveform classifiers (ESP, ANN, SVM, etc.) |
| Substation Analytics 183 | Support for programmable real time analytics applications; DNP3 scan master; The substation analytics may allow for analysis of the real-time operational and non-operational data in order to determine if an "event" has occurred. The "event" determination may be rule-based with the rules determining whether one of a plurality of possible events occurring based on the data. The substation analytics may also allow for automatic modification of the operation of the substation based on a determined event. In this way, the grid (including various portions of the grid) may be "self-healing." This "self-healing" aspect avoids the requirement that the data be transmitted to a central authority, the data be analyzed at the central authority, and a command be sent from the central authority to the grid before the problem in the grid be corrected. In addition to the determination of the "event," the substation analytics may also generate a work-order for transmission to a central authority. The work-order may be used, for example, for scheduling a repair of a device, such as a substation. |
| Substation LAN 172 | Local networking inside the substation to various portions of the substation, such as microprocessor relays 173, substation instrumentation 174, event file recorders 175, and station RTUs 176. |
| Security services 171 | The substation may communicate externally with various utility communications networks via the security services layer. |

As discussed above, different elements within the smart grid may include additional functionality including additional processing/analytical capability and database resources. The use of this additional functionality within various elements in the smart grid enables distributed architectures with centralized management and administration of applications and network performance. For functional, performance, and scalability reasons, a smart grid involving thousands to tens of thousands of INDE SUBSTATIONS 180 and tens of thousands to millions of grid devices may include distributed processing, data management, and process communications.

The INDE SUBSTATION 180 may include one or more processors and one or more memory devices (such as substation non-operational data 181 and substation operations data 182). Non-operational data 181 and substation operations data 182 may be associated with and proximate to the substation, such as located in or on the INDE SUBSTATION 180. The INDE SUBSTATION 180 may further include components of the smart grid that are responsible for the observability of the smart grid at a substation level. The INDE SUBSTATION 180 components may provide three primary functions: operational data acquisition and storage in the distributed operational data store; acquisition of non-operational data and storage in the historian; and local analytics processing on a real time (such as a sub-second) basis. Processing may include digital signal processing of voltage and current waveforms, detection and classification processing, including event stream processing; and communications of processing results to local systems and devices as well as to systems at the operations control center 116. Communication between the INDE SUBSTATION 180 and other devices in the grid may be wired, wireless, or a combination of wired and wireless. For example, the transmission of data from the INDE SUBSTATION 180 to the operations control center 116 may be wired. The INDE SUBSTATION 180 may transmit data, such as operation/non-operational data or event data, to the operations control center 116. Routing device 190 may route the transmitted data to one of the operational/non-operational data bus 146 or the event bus 147.

Demand response optimization for distribution loss management may also be performed here. This architecture is in accordance with the distributed application architecture principle previously discussed.

For example, connectivity data may be duplicated at the substation 170 and at the operations control center 116, thereby allowing a substation 170 to operate independently even if the data communication network to the operations control center 116 is not functional. With this information (connectivity) stored locally, substation analytics may be performed locally even if the communication link to the operations control center is inoperative.

Similarly, operational data may be duplicated at the operations control center 116 and at the substations 170. Data from the sensors and devices associated with a particular substation may be collected and the latest measurement may be stored in this data store at the substation. The data structures of the operational data store may be the same and hence database links may be used to provide seamless access to data that resides on the substations thru the instance of the operational data store at the control center. This provides a number of advantages including alleviating data replication and enabling substation data analytics, which is more time sensitive, to occur locally and without reliance on communication availability beyond the substation. Data analytics at the operations control center level 116 may be less time sensitive (as the operations control center 116 may typically examine historical data to discern patterns that are more predictive, rather than reactive) and may be able to work around network issues if any.

Finally, historical data may be stored locally at the substation and a copy of the data may be stored at the control center. Or, database links may be configured on the repository instance at the operations control center 116, providing the operations control center access to the data at the individual substations. Substation analytics may be performed locally at the substation 170 using the local data store. Specifically, using the additional intelligence and storage capability at the substation enables the substation to analyze itself and to correct itself without input from a central authority. Alternatively, historical/collective analytics may also be performed at the operations control center level 116 by accessing data at the local substation instances using the database links.

INDE DEVICE

The INDE DEVICE 188 group may comprise any variety of devices within the smart grid, including various sensors within the smart grid, such as various distribution grid devices 189 (e.g., line sensors on the power lines), meters 163 at the customer premises, etc. The INDE DEVICE 188 group may comprise a device added to the grid with particular functionality (such as a smart Remote Terminal Unit (RTU) that includes dedicated programming), or may comprise an existing device within the grid with added functionality (such as an existing open architecture pole top RTU that is already in place in the grid that may be programmed to create a smart line sensor or smart grid device). The INDE DEVICE 188 may further include one or more processors and one or more memory devices.

Existing grid devices may not be open from the software standpoint, and may not be capable of supporting much in the way of modern networking or software services. The existing grid devices may have been designed to acquire and store data for occasional offload to some other device such as a laptop computer, or to transfer batch files via PSTN line to a remote host on demand. These devices may not be designed for operation in a real time digital network environment. In these cases, the grid device data may be obtained at the substation level 170, or at the operations control center level 116, depending on how the existing communications network has been designed. In the case of meters networks, it will normally be the case that data is obtained from the meter data collection engine, since meter networks are usually closed and the meters may not be addressed directly. As these networks evolve, meters and other grid devices may be individually addressable, so that data may be transported directly to where it is needed, which may not necessarily be the operations control center 116, but may be anywhere on the grid.

Devices such as faulted circuit indicators may be married with wireless network interface cards, for connection over modest speed (such as 100 kbps) wireless networks. These devices may report status by exception and carry out fixed pre-programmed functions. The intelligence of many grid devices may be increased by using local smart RTUs. Instead of having poletop RTUs that are designed as fixed function, closed architecture devices, RTUs may be used as open architecture devices that can be programmed by third parties and that may serve as an INDE DEVICE 188 in the INDE Reference Architecture. Also, meters at customers' premises may be used as sensors. For example, meters may measure consumption (such as how much energy is consumed for purposes of billing) and may measure voltage (for use in volt/VAr optimization).

Figure 5A:
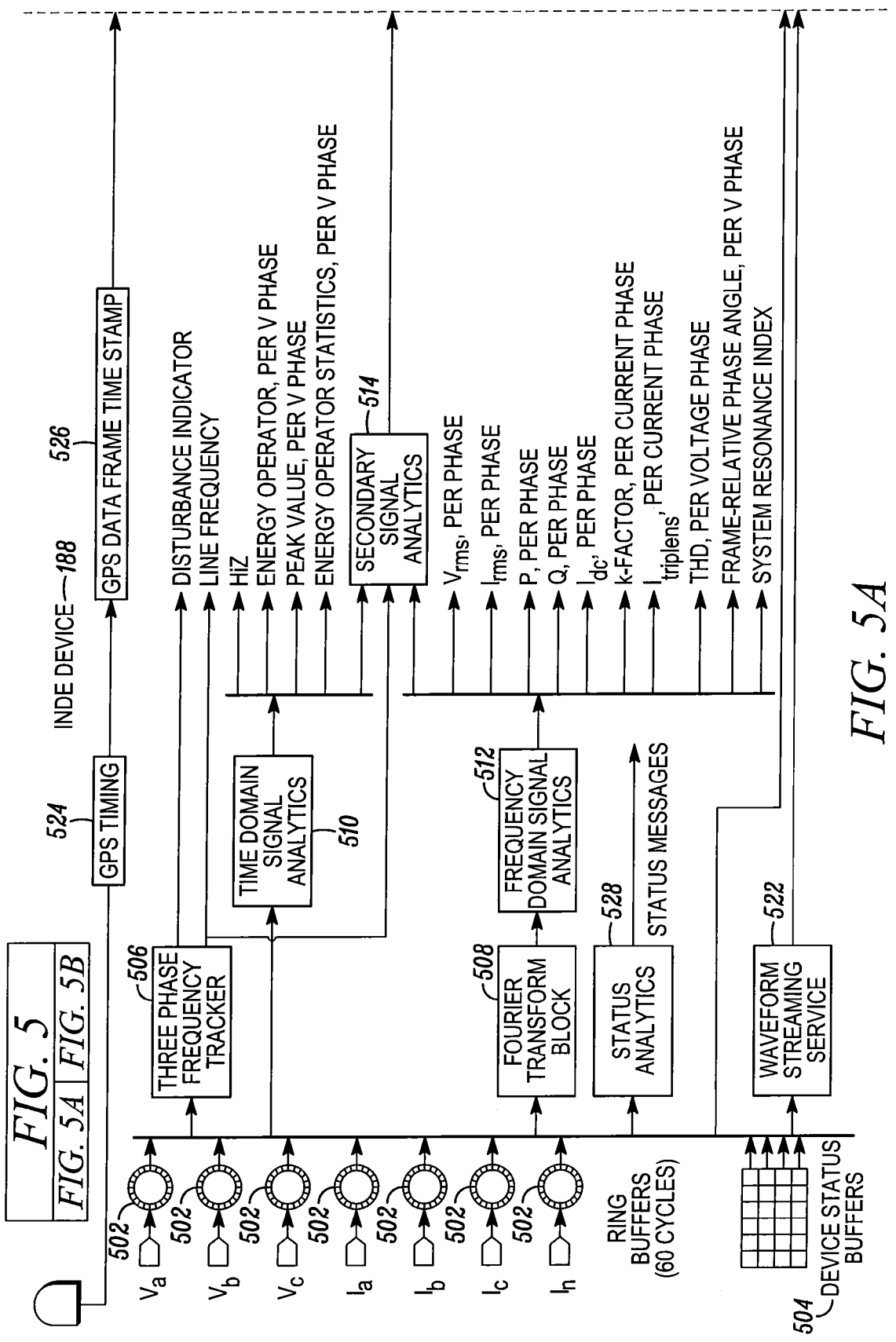
FIG. 5 is a block diagram of the INDE DEVICE depicted in FIGS. 1 and 3.
Figure 5B:
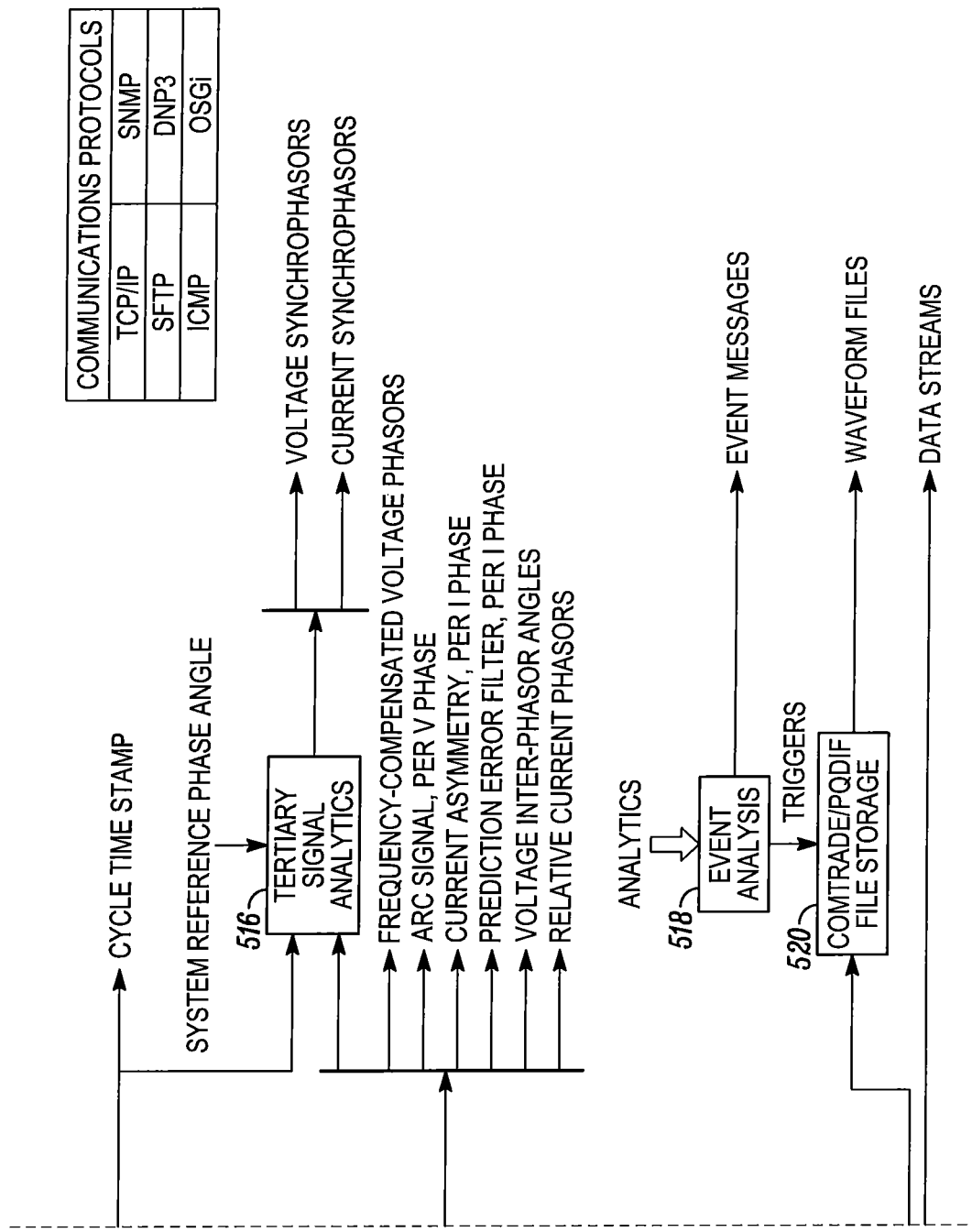

FIG. 5 illustrates an example architecture for INDE DEVICE 188 group. Table 3 describes the certain INDE DEVICE 188 elements. The smart grid device may include an embedded processor, so the processing elements are less like SOA services and more like real time program library routines, since the DEVICE group is implemented on a dedicated real time DSP or microprocessor.

TABLE 3

| INDE DEVICE Elements | |
|---|---|
| INDE DEVICE ELEMENTS | Description |
| Ring buffers 502 | Local circular buffer storage for digital waveforms sampled from analog transducers (voltage and current waveforms for example) which may be used hold the data for waveforms at different time periods so that if an event is detected, the waveform data leading up to the event may also be stored |
| Device status buffers 504 | Buffer storage for external device state and state transition data |
| Three phase frequency tracker 506 | Computes a running estimate of the power frequency from all three phases; used for frequency correction to other data as well as in grid stability and power quality measures (especially as relates to DG) |
| Fourier transform block 508 | Conversion of time domain waveforms to frequency domain to enable frequency domain analytics |

TABLE 3-continued

INDE DEVICE Elements

| INDE DEVICE ELEMENTS | Description |
| --- | --- |
| Time domain signal analytics 510 | Processing of the signals in the time domain; extraction of transient and envelop behavior measures |
| Frequency domain signal analytics 512 | Processing of the signals in the frequency domain; extraction of RMS and power parameters |
| Secondary signal analytics 514 | Calculation and compensation of phasors; calculation of selected error/fault measures |
| Tertiary signal analytics 516 | Calculation of synchrophasors based on GPS timing and a system reference angle |
| Event analysis and triggers 518 | Processing of all analytics for event detection and triggering of file capture. Different types of INDE DEVICES may include different event analytical capability. For example, a line sensor may examine ITIC events, examining spikes in the waveform. If a spike occurs (or a series of spikes occur), the line sensor, with the event analytical capability, may determine that an "event" has occurred and also may provide a recommendation as to the cause of the event. The event analytical capability may be rule-based, with different rules being used for different INDE DEVICES and different applications. |
| File storage - capture/formatting/transmission 520 | Capture of data from the ring buffers based on event triggers |
| Waveform streaming service 522 | Support for streaming of waveforms to a remote display client |
| Communications stack | Support for network communications and remote program load |
| GPS Timing 524 | Provides high resolution timing to coordinate applications and synchronize data collection across a wide geographic area. The generated data may include a GPS data frame time stamp 526. |
| Status analytics 528 | Capture of data for status messages |

FIG. 1 further depicts customer premises 179, which may include one or more Smart Meters 163, an in-home display 165, one or more sensors 166, and one or more controls 167. In practice, sensors 166 may register data at one or more devices at the customer premises 179. For example, a sensor 166 may register data at various major appliances within the customer premises 179, such as the furnace, hot water heater, air conditioner, etc. The data from the one or more sensors 166 may be sent to the Smart Meter 163, which may package the data for transmission to the operations control center 116 via utility communication network 160. The in-home display 165 may provide the customer at the customer premises with an output device to view, in real-time, data collected from Smart Meter 163 and the one or more sensors 166. In addition, an input device (such as a keyboard) may be associated with in-home display 165 so that the customer may communicate with the operations control center 116. In one embodiment, the in-home display 165 may comprise a computer resident at the customer premises.

The customer premises 165 may further include controls 167 that may control one or more devices at the customer premises 179. Various appliances at the customer premises 179 may be controlled, such as the heater, air conditioner, etc., depending on commands from the operations control center 116.

As depicted in FIG. 1, the customer premises 169 may communicate in a variety of ways, such as via the Internet 168, the public-switched telephone network (PSTN) 169, or via a dedicated line (such as via collector 164). Via any of the listed communication channels, the data from one or more customer premises 179 may be sent. As shown in FIG. 1, one or more customer premises 179 may comprise a Smart Meter Network 178 (comprising a plurality of smart meters 163), sending data to a collector 164 for transmission to the operations control center 116 via the utility management network 160. Further, various sources of distributed energy generation/storage 162 (such as solar panels, etc.) may send data to a monitor control 161 for communication with the operations control center 116 via the utility management network 160.

As discussed above, the devices in the power grid outside of the operations control center 116 may include processing and/or storage capability. The devices may include the INDE SUBSTATION 180 and the INDE DEVICE 188. In addition to the individual devices in the power grid including additional intelligence, the individual devices may communicate with other devices in the power grid, in order to exchange information (include sensor data and/or analytical data (such as event data)) in order to analyze the state of the power grid (such as determining faults) and in order to change the state of the power grid (such as correcting for the faults). Specifically, the individual devices may use the following: (1) intelligence (such as processing capability); (2) storage (such as the distributed storage discussed above); and (3) communication (such as the use of the one or more buses discussed above). In this way, the individual devices in the power grid may communicate and cooperate with one another without oversight from the operations control center 116.

For example, the INDE architecture disclosed above may include a device that senses at least one parameter on the feeder circuit. The device may further include a processor that monitors the sensed parameter on the feeder circuit and that analyzes the sensed parameter to determine the state of the feeder circuit. For example, the analysis of the sense parameter may comprise a comparison of the sensed parameter with a predetermined threshold and/or may comprise a trend analysis. One such sensed parameter may include sensing the waveforms and one such analysis may comprise determining whether the sensed waveforms indicate a fault on the feeder circuit. The device may further communicate with one or more substations. For example, a particular substation may supply power to a particular feeder circuit. The device may sense the state of the particular feeder circuit, and determine whether there is a fault on the particular feeder circuit. The device may communicate with the substation. The substation may analyze the fault determined by the device and may take corrective action depending on the fault (such as reducing the power supplied to the feeder circuit). In the example of the device sending data indicating a fault (based on analysis of waveforms), the substation may alter the power supplied to the feeder circuit without input from the operations control center 116. Or, the substation may combine the data indicating the fault with information from other sensors to further refine the analysis of the fault. The substation may further communicate with the operations control center 116, such as the outage intelligence application and/or the fault intelligence application. Thus, the operations control center 116 may determine the fault and may determine the extent of the outage (such as the number of homes affected by the fault). In this way, the device sensing the state of the feeder circuit may cooperatively work with the substation in order to correct a potential fault with or without requiring the operations control center 116 to intervene.

As another example, a line sensor, which includes additional intelligence using processing and/or memory capability, may produce grid state data in a portion of the grid (such as a feeder circuit). The grid state data may be shared with the demand response management system 155 at the operations control center 116. The demand response management system 155 may control one or more devices at customer sites on the feeder circuit in response to the grid state data from the line sensor. In particular, the demand response management system 155 may command the energy management system 156 and/or the distribution management system 157 to reduce load on the feeder circuit by turning off appliances at the customer sites that receive power from the feeder circuit in response to line sensor indicating an outage on the feeder circuit. In this way, the line sensor in combination with the demand response management system 155 may shift automatically load from a faulty feeder circuit and then isolate the fault.

As still another example, one or more relays in the power grid may have a microprocessor associated with it. These relays may communicate with other devices and/or databases resident in the power grid in order to determine a fault and/or control the power grid.

INDS Concept and Architecture
Outsourced Smart Grid Data/Analytics Services Model One application for the smart grid architecture allows the utility to subscribe to grid data management and analytics services while maintaining traditional control systems and related operational systems in-house. In this model, the utility may install and own grid sensors and devices (as described above), and may either own and operate the grid data transport communication system, or may outsource it. The grid data may flow from the utility to a remote Intelligent Network Data Services (INDS) hosting site, where the data may be managed, stored, and analyzed. The utility may then subscribe to data and analytics services under an appropriate services financial model. The utility may avoid the initial capital expenditure investment and the ongoing costs of management, support, and upgrade of the smart grid data/analytics infrastructure, in exchange for fees. The INDE Reference Architecture, described above, lends itself to the outsourcing arrangement described herein.

INDS Architecture for Smart Grid Services

Figure 6A:
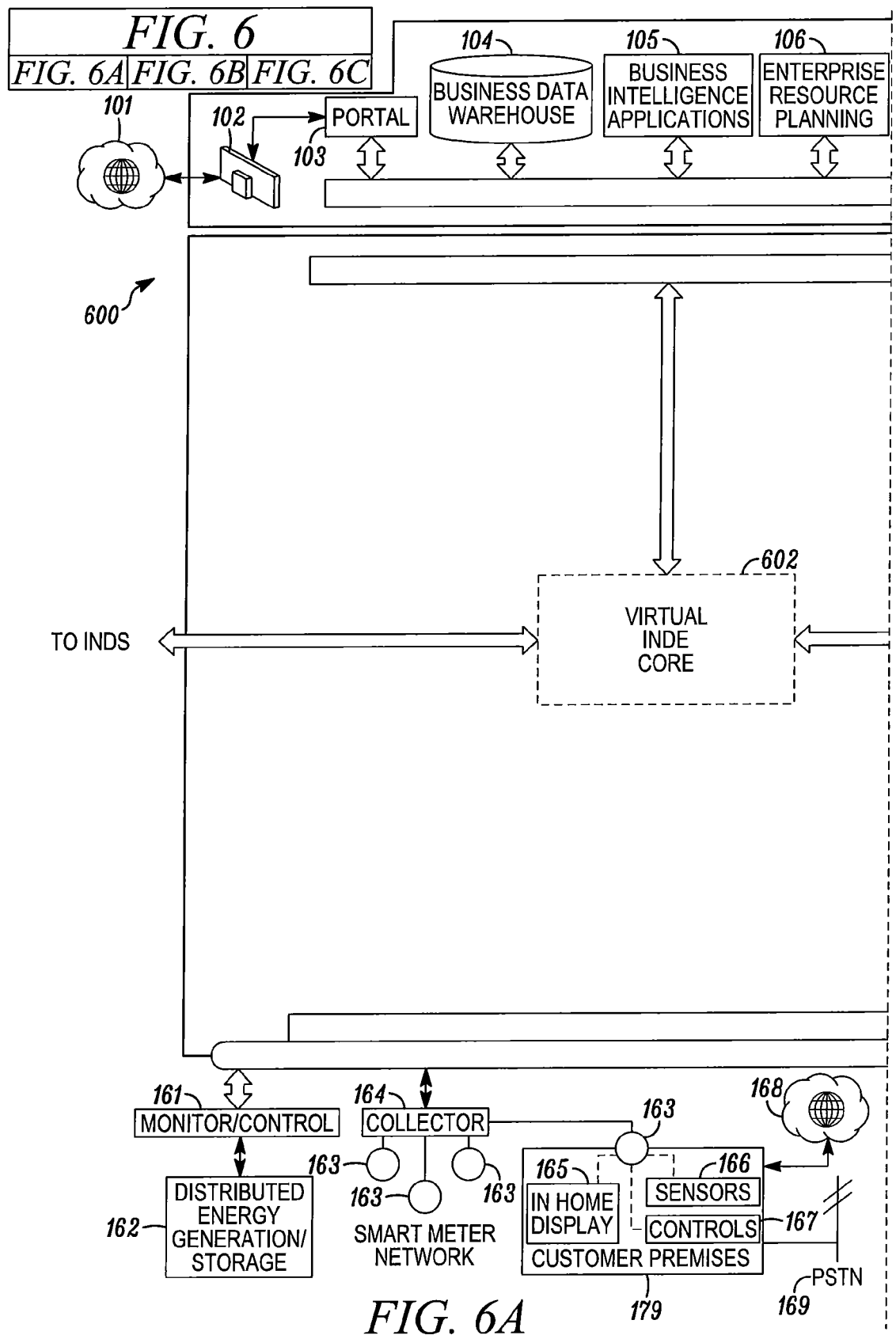
FIG. 6 is a block diagram of still another example of the overall architecture for a power grid.
Figure 6B:
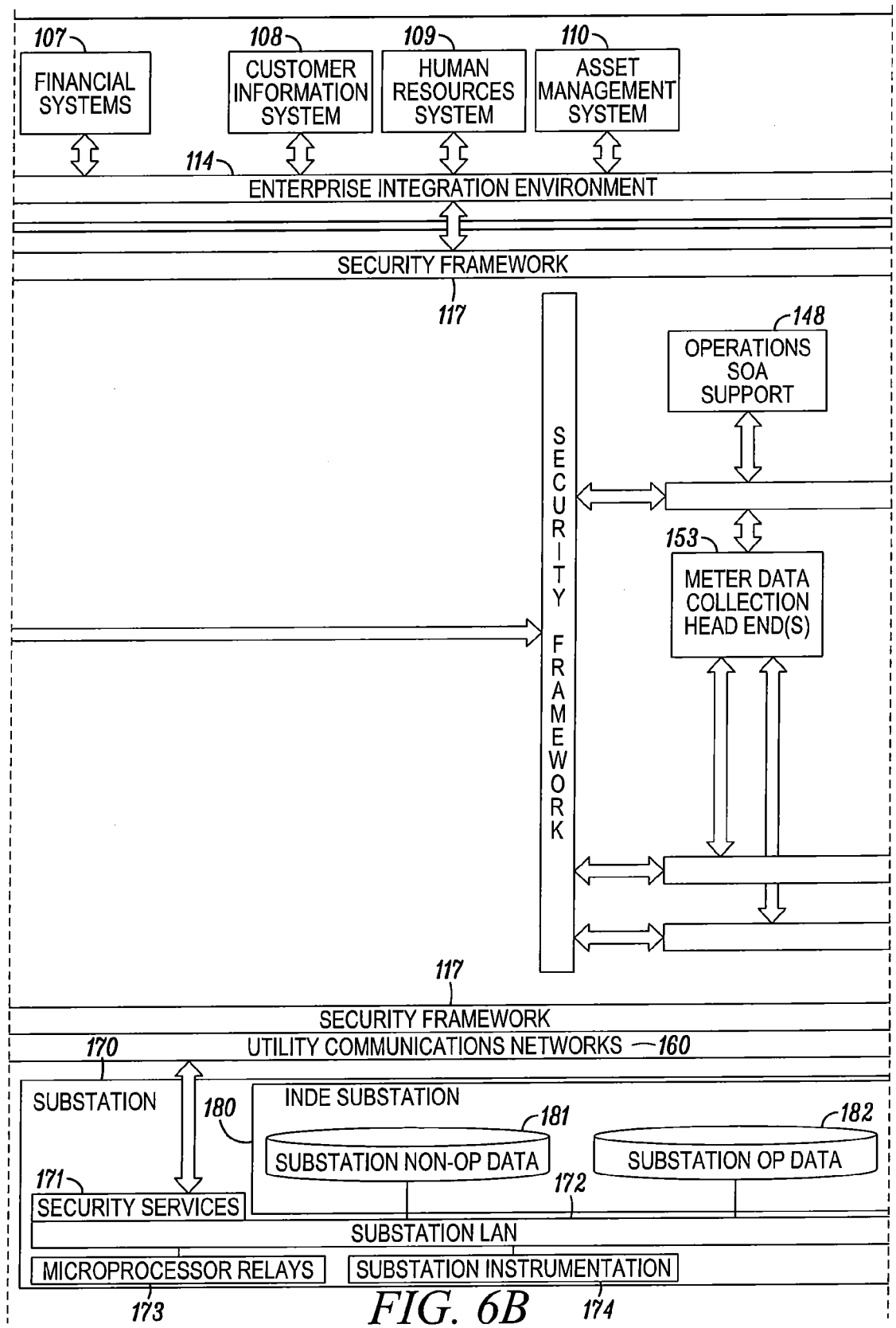
Figure 6C:
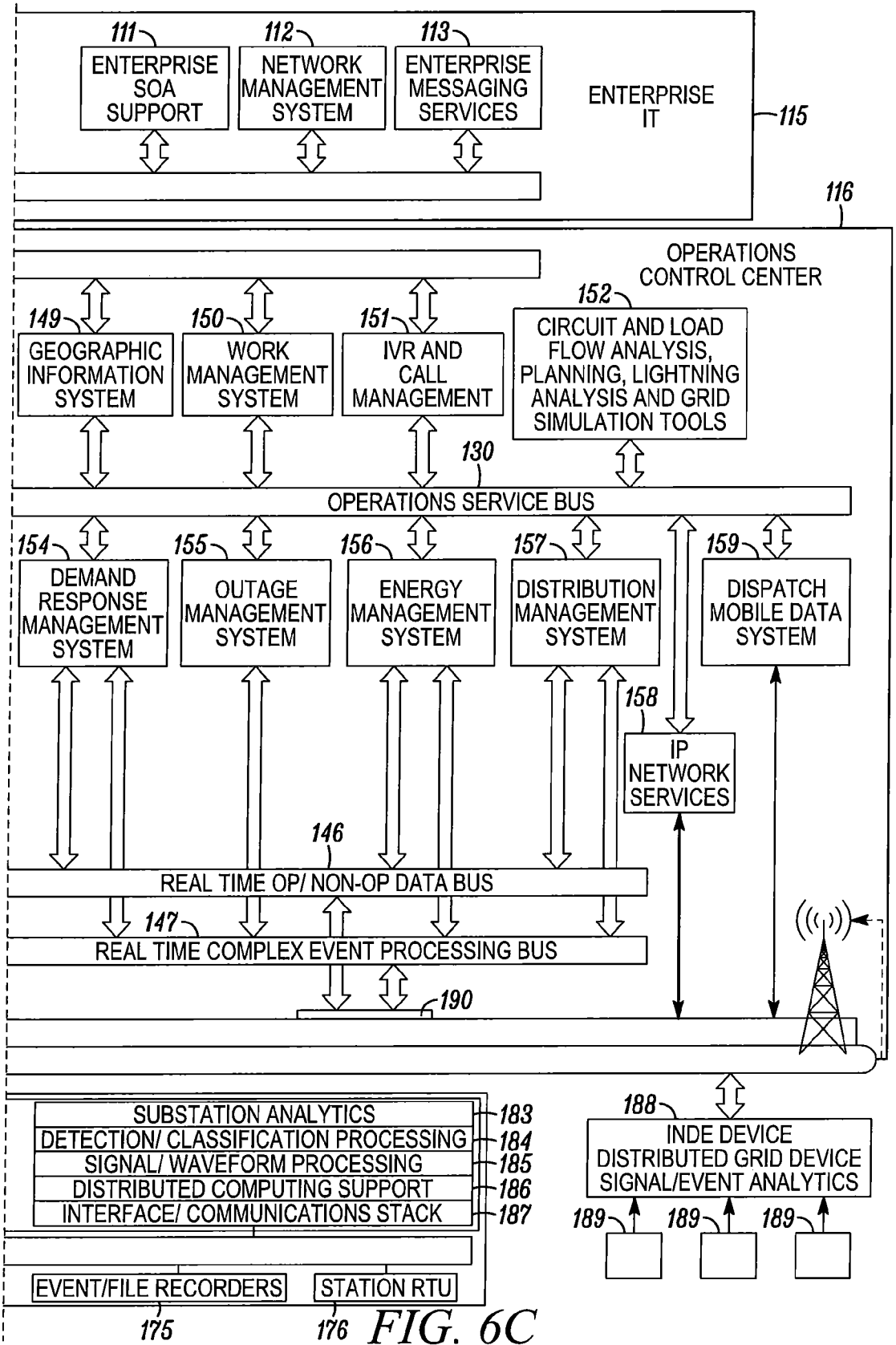

In order to implement the INDS services model, the INDE Reference Architecture may be partitioned into a group of elements that may be hosted remotely, and those that may remain at the utility. FIG. 6 illustrates how the utility architecture may look once the INDE CORE 120 has been made remote. A server may be included as part of the INDE CORE 120 that may act as the interface to the remote systems. To the utility systems, this may appear as a virtual INDE CORE 602.

As the overall block diagram 600 in FIG. 6 shows, the INDE SUBSTATION 180 and INDE DEVICE 188 groups are unchanged from that depicted in FIG. 1. The multiple bus structure may also still be employed at the utility as well.

Figure 7:
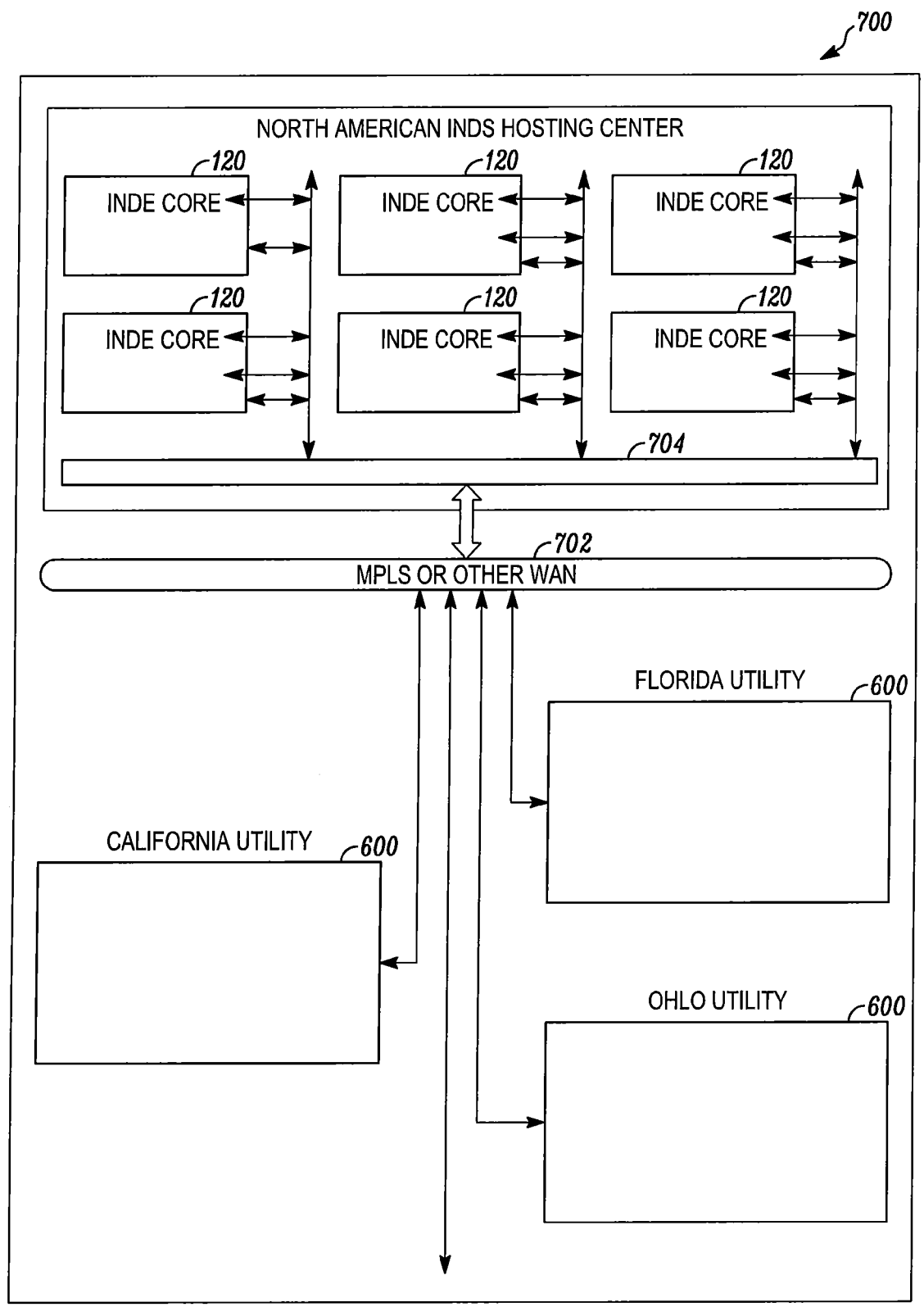
FIG. 7 is a block diagram of still another example of the overall architecture for a power grid.

The INDE CORE 120 may be remotely hosted, as the block diagram 700 in FIG. 7 illustrates. At the hosting site, INDE COREs 120 may be installed as needed to support utility INDS subscribers (shown as North American INDS Hosting Center 702). Each CORE 120 may be a modular system, so that adding a new subscriber is a routine operation. A party separate from the electric utility may manage and support the software for one, some, or all of the INDE COREs 120, as well as the applications that are downloaded from the INDS hosting site to each utility's INDE SUBSTATION 180 and INDE DEVICES 188.

In order to facilitate communications, high bandwidth low latency communications services, such as via network 704 (e.g., a MPLS or other WAN), may be use that can reach the subscriber utility operations centers, as well as the INDS hosting sites. As shown in FIG. 7, various areas may be served, such as California, Florida, and Ohio. This modularity of the operations not only allows for efficient management of various different grids. It also allows for better inter-grid management. There are instances where a failure in one grid may affect operations in a neighboring grid. For example, a failure in the Ohio grid may have a cascade effect on operations in a neighboring grid, such as the mid-Atlantic grid. Using the modular structure as illustrated in FIG. 7 allows for management of the individual grids and management of inter-grid operations. Specifically, an overall INDS system (which includes a processor and a memory) may manage the interaction between the various INDE COREs 120. This may reduce the possibility of a catastrophic failure that cascades from one grid to another. For example, a failure in the Ohio grid may cascade to a neighboring grid, such as the mid-Atlantic grid. The INDE CORE 120 dedicated to managing the Ohio grid may attempt to correct for the failure in the Ohio grid. And, the overall INDS system may attempt to reduce the possibility of a cascade failure occurring in neighboring grids.

Specific Examples of Functionality in INDE CORE

As shown in FIGS. 1, 6, and 7, various functionalities (represented by blocks) are included in the INDE CORE 120, two of which depicted are meter data management services (MDMS) 121 and metering analytics and services 122. Because of the modularity of the architecture, various functionality, such as MDMS 121 and metering analytics and services 122, may be incorporated.

Observability Processes

Figure 8:
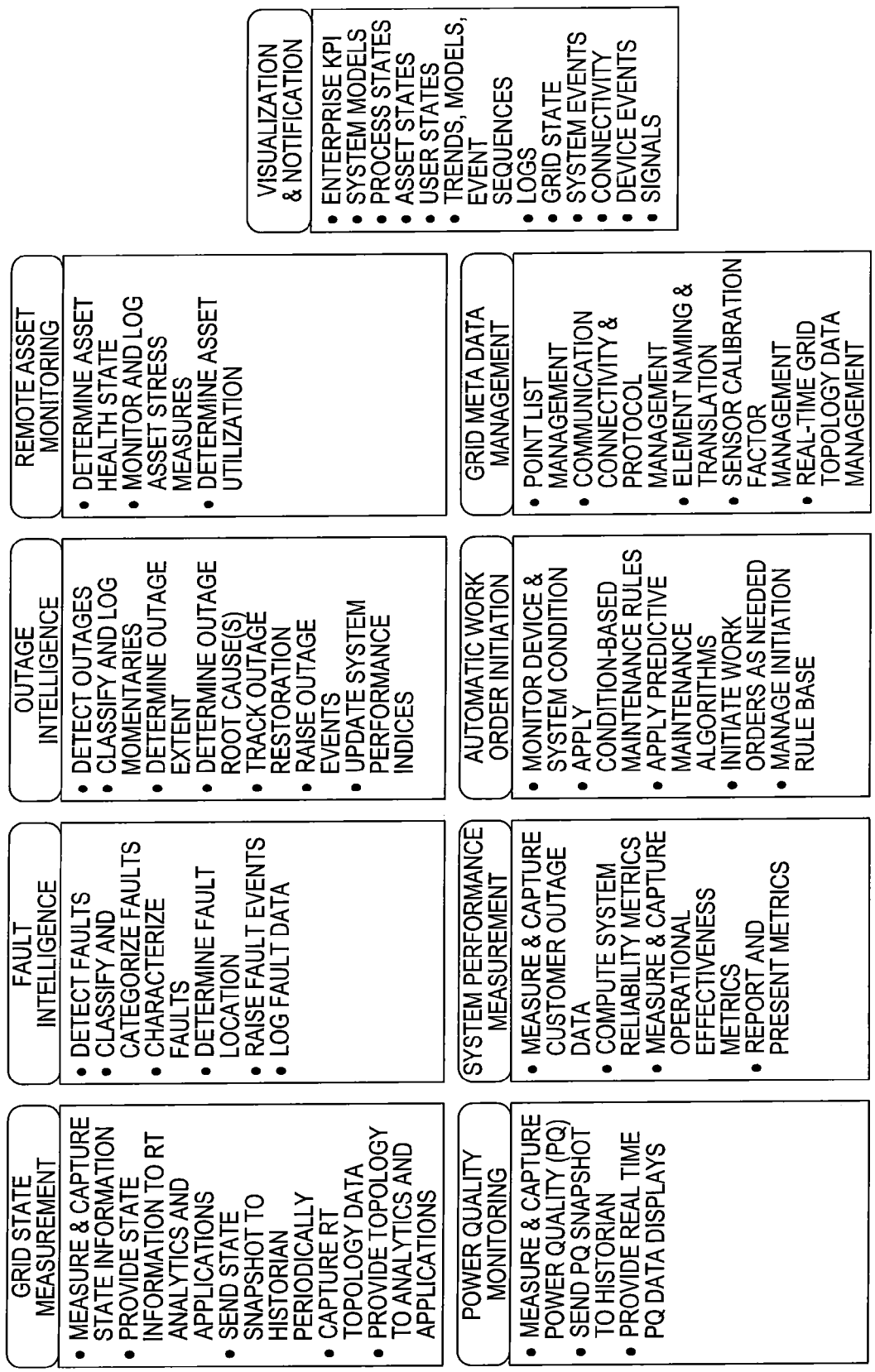
FIG. 8 is a block diagram including a listing of some examples of the observability processes.

As discussed above, one functionality of the application services may include observability processes. The observability processes may allow the utility to "observe" the grid. These processes may be responsible for interpreting the raw data received from all the sensors and devices on the grid and turning them into actionable information. FIG. 8 includes a listing of some examples of the observability processes.

Figure 9B:
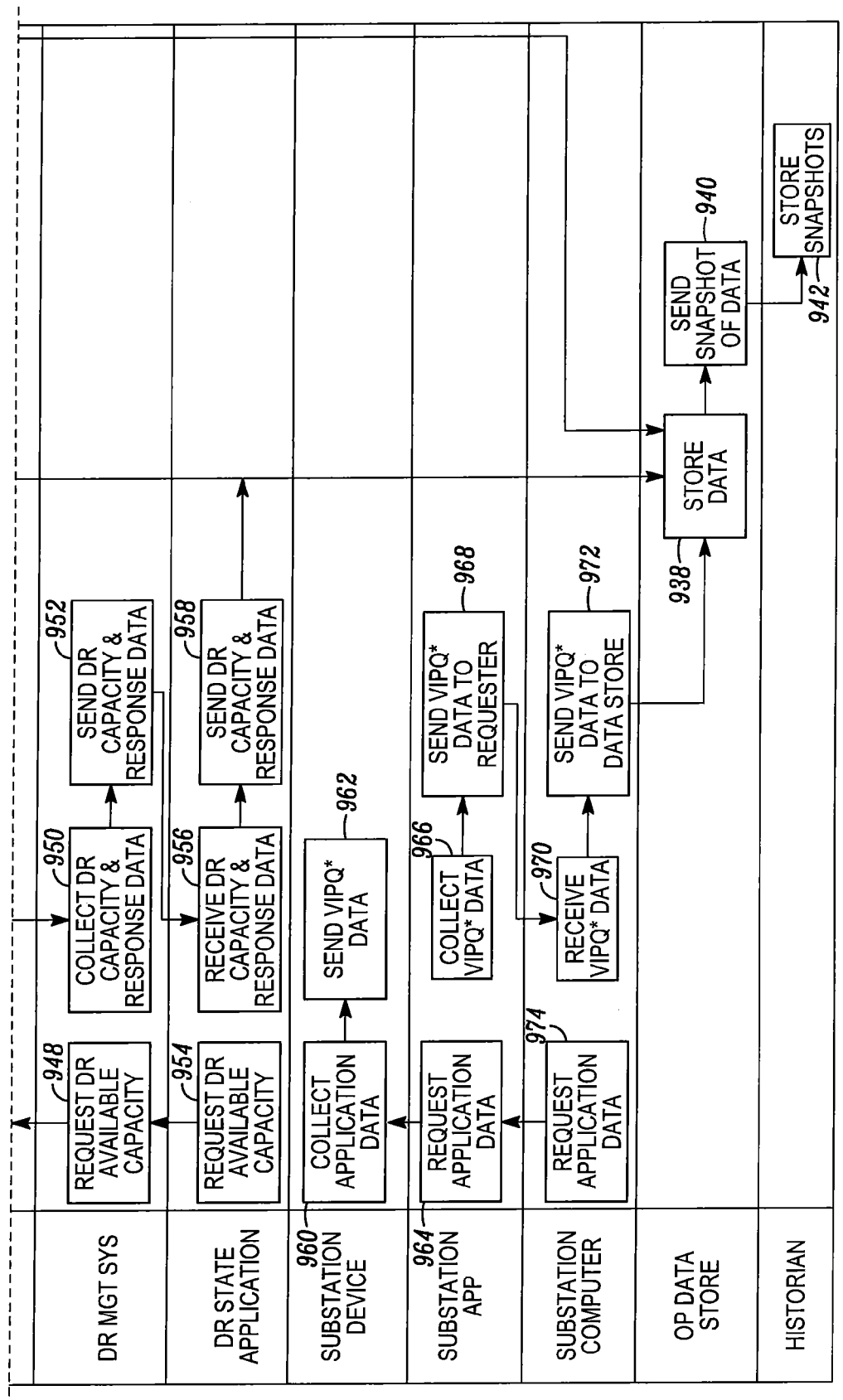
FIG. 9 illustrates a flow diagram of the Grid State Measurement & Operations Processes.

FIG. 9 illustrates a flow diagram 900 of the Grid State Measurement & Operations Processes. As shown, the Data Scanner may request meter data, as shown at block 902. The request may be sent to one or more grid devices, substation computers, and line sensor RTUs. In response to the request, the devices may collect operations data, as shown at blocks 904, 908, 912, and may send data (such as one, some or all of the operational data, such as Voltage, Current, Real Power, and Reactive Power data), as shown at blocks 906, 910, 914. The data scanner may collect the operational data, as shown at block 926, and may send the data to the operational data store, as shown at block 928. The operational data store may store the operational data, as shown at block 938. The operational data store may further send a snapshot of the data to the historian, as shown at block 940, and the historian may store the snapshot of the data, as shown at block 942.

The meter state application may send a request for meter data to the Meter DCE, as shown in block 924, which in turn sends a request to one or more meters to collect meter data, as shown at block 920. In response to the request, the one or more meters collects meter data, as shown at block 916, and sends the voltage data to the Meter DCE, as shown at block 918. The Meter DCE may collect the voltage data, as shown at block 922, and send the data to the requestor of the data, as shown at block 928. The meter state application may receive the meter data, as shown at block 930, and determine whether it is for a single value process or a voltage profile grid state, as shown at block 932. If it is for the single value process, the meter data is send to the requesting process, as shown at block 936. If the meter data is for storage to determine the grid state at a future time, the meter data is stored in the operational data store, as shown at block 938. The operational data store further sends a snapshot of the data to the historian, as shown at block 940, and the historian stores the snapshot of the data, as shown at block 942.

FIG. 9 further illustrates actions relating to demand response (DR). Demand response refers to dynamic demand mechanisms to manage customer consumption of electricity in response to supply conditions, for example, having electricity customers reduce their consumption at critical times or in response to market prices. This may involve actually curtailing power used or by starting on site generation which may or may not be connected in parallel with the grid. This may be different from energy efficiency, which means using less power to perform the same tasks, on a continuous basis or whenever that task is performed. In demand response, customers, using one or more control systems, may shed loads in response to a request by a utility or market price conditions. Services (lights, machines, air conditioning) may be reduced according to a preplanned load prioritization scheme during the critical timeframes. An alternative to load shedding is on-site generation of electricity to supplement the power grid. Under conditions of tight electricity supply, demand response may significantly reduce the peak price and, in general, electricity price volatility.

Demand response may generally be used to refer to mechanisms used to encourage consumers to reduce demand, thereby reducing the peak demand for electricity. Since electrical systems are generally sized to correspond to peak demand (plus margin for error and unforeseen events), lowering peak demand may reduce overall plant and capital cost requirements. Depending on the configuration of generation capacity, however, demand response may also be used to increase demand (load) at times of high production and low demand. Some systems may thereby encourage energy storage to arbitrage between periods of low and high demand (or low and high prices). As the proportion of intermittent power sources such as wind power in a system grows, demand response may become increasingly important to effective management of the electric grid.

The DR state application may request the DR available capacity, as shown at block 954. The DR management system may then request available capacity from one or more DR home devices, as shown at block 948. The one or more home devices may collect available DR capacity in response to the request, as shown at block 944, and send the DR capacity and response data to the DR management system, as shown at block 946. The DR management system may collect the DR capacity and response data, as shown at block 950, and send the DR capacity and response data to the DR state application, as shown at block 952. The DR state application may receive the DR capacity and response data, as shown at block 956, and send the capacity and response data to the operational data store, as shown at block 958. The operational data store may store the DR capacity and response data, as shown at block 938. The operational data store may further send a snapshot of the data to the historian, as shown at block 940, and the historian may store the snapshot of the data, as shown at block 942.

The substation computer may request application data from the substation application, as shown at block 974. In response, the substation application may request application from the substation device, as shown at block 964. The substation device may collect the application data, as shown at block 960, and send the application data to the substation device (which may include one, some or all of Voltage, Current, Real Power, and Reactive Power data), as shown at block 962. The substation application may collect the application data, as shown at block 966, and send the application data to the requestor (which may be the substation computer), as shown at block 968. The substation computer may receive the application data, as shown at block 970, and send the application data to the operational data store, as shown at block 972.

The grid state measurement and operational data process may comprise deriving the grid state and grid topology at a given point in time, as well as providing this information to other system and data stores. The sub-processes may include: (1) measuring and capturing grid state information (this relates to the operational data pertaining to the grid that was discussed previously); (2) sending grid state information to other analytics applications (this enables other applications, such as analytical applications, access to the grid state data); (3) persisting grid state snapshot to connectivity/operational data store (this allows for updating the grid state information to the connectivity/operational data store in the appropriate format as well as forwarding this information to the historian for persistence so that a point in time grid topology may be derived at a later point in time); (4) deriving grid topology at a point in time based on default connectivity and current grid state (this provides the grid topology at a given point in time by applying the point in time snapshot of the grid state in the historian to the base connectivity in the connectivity data store, as discussed in more detail below); and (5) providing grid topology information to applications upon request.

With regard to sub-process (4), the grid topology may be derived for a predetermined time, such as in real-time, 30 seconds ago, 1 month ago, etc. In order to recreate the grid topology, multiple databases may be used, and a program to access the data in the multiple databases to recreate the grid topology. One database may comprise a relational database that stores the base connectivity data (the "connectivity database"). The connectivity database may hold the grid topology information as built in order to determine the baseline connectivity model. Asset and topology information may be updated into this database on a periodic basis, depending on upgrades to the power grid, such as the addition or modification of circuits in the power grid (e.g., additional feeder circuits that are added to the power grid). The connectivity database may be considered "static" in that it does not change. The connectivity database may change if there are changes to the structure of the power grid. For example, if there is a modification to the feeder circuits, such as an addition of a feeder circuit, the connectivity database may change.

A second database may be used to store the "dynamic" data. The second database may comprise a non-relational database. One example of a non-relational database may comprise a historian database, which stores the time series non-operational data as well as the historical operational data. The historian database may stores a series of "flat" records such as: (1) time stamp; (2) device ID; (3) a data value; and (4) a device status. Furthermore, the stored data may be compressed. Because of this, the operation/non-operational data in the power grid may be stored easily, and may be manageable even though a considerable amount of data may be available. For example, data on the order of 5 Terabytes may be online at any given time for use in order to recreate the grid topology. Because the data is stored in the simple flat record (such as no organizational approach), it allows efficiency in storing data. As discussed in more detail below, the data may be accessed by a specific tag, such as data element identifiers.

Various analytics for the grid may wish to receive, as input, the grid topology at a particular point in time. For example, analytics relating to power quality, reliability, asset health, etc. may use the grid topology as input. In order to determine the grid topology, the baseline connectivity model, as defined by the data in the connectivity database, may be accessed. For example, if the topology of a particular feeder circuit is desired, the baseline connectivity model may define the various switches in the particular feeder circuit in the power grid. After which, the historian database may be accessed (based on the particular time) in order to determine the values of the switches in the particular feeder circuit. Then, a program may combine the data from the baseline connectivity model and the historian database in order to generate a representation of the particular feeder circuit at the particular time.

A more complicated example to determine the grid topology may include multiple feeder circuits (e.g., feeder circuit A and feeder circuit B) that have an inter-tie switch and sectionalizing switches. Depending on the switch states of certain switches (such as the inter-tie switch and/or the sectionalizing switches), sections of the feeder circuits may belong to feeder circuit A or feeder circuit B. The program that determines the grid topology may access the data from both the baseline connectivity model and the historian database in order to determine the connectivity at a particular time (e.g, which circuits belong to feeder circuit A or feeder circuit B).

Figure 10:
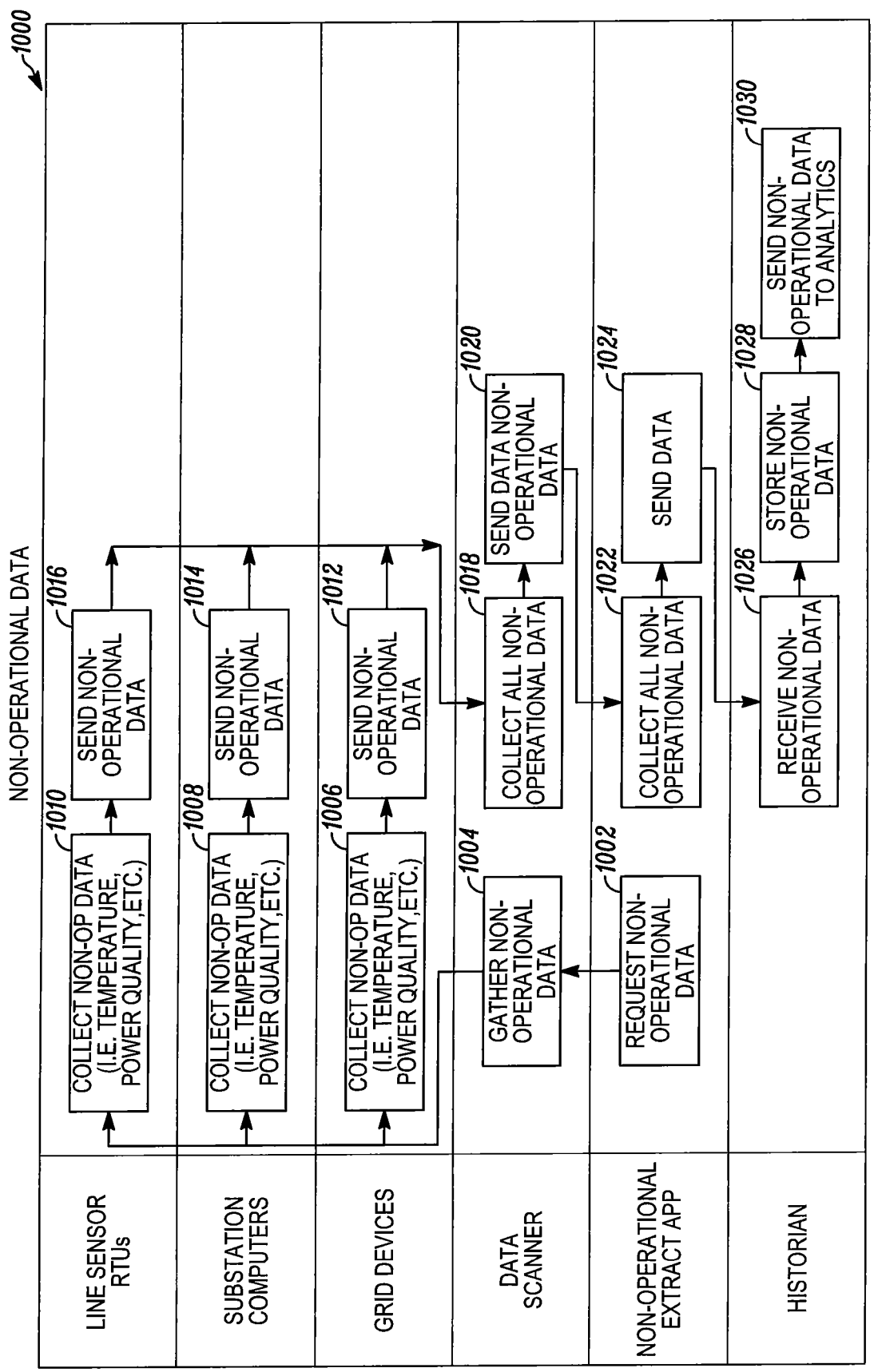
FIG. 10 illustrates a flow diagram of the Non-Operational Data processes.

FIG. 10 illustrates a flow diagram 1000 of the Non-Operational Data processes. The non-operational extract application may request non-operational data, as shown at block 1002. In response, the data scanner may gather non-operational data, as shown at block 1004, where by various devices in the power grid, such as grid devices, substation computers, and line sensor RTUs, may collect non-operational data, as shown at blocks 1006, 1008, 1110. As discussed above, non-operational data may include temperature, power quality, etc. The various devices in the power grid, such as grid devices, substation computers, and line sensor RTUs, may send the non-operational data to the data scanner, as shown at blocks 1012, 1014, 1116. The data scanner may collect the non-operational data, as shown at block 1018, and send the non-operational data to the non-operational extract application, as shown at block 1020. The non-operational extract application may collect the non-operational data, as shown at block 1022, and send the collected non-operational data to the historian, as shown at block 1024. The historian may receive the non-operational data, as shown at block 1026, store the non-operational data, as shown at block 1028, and send the non-operational data to one or more analytics applications, as shown at block 1030.

Figure 11:
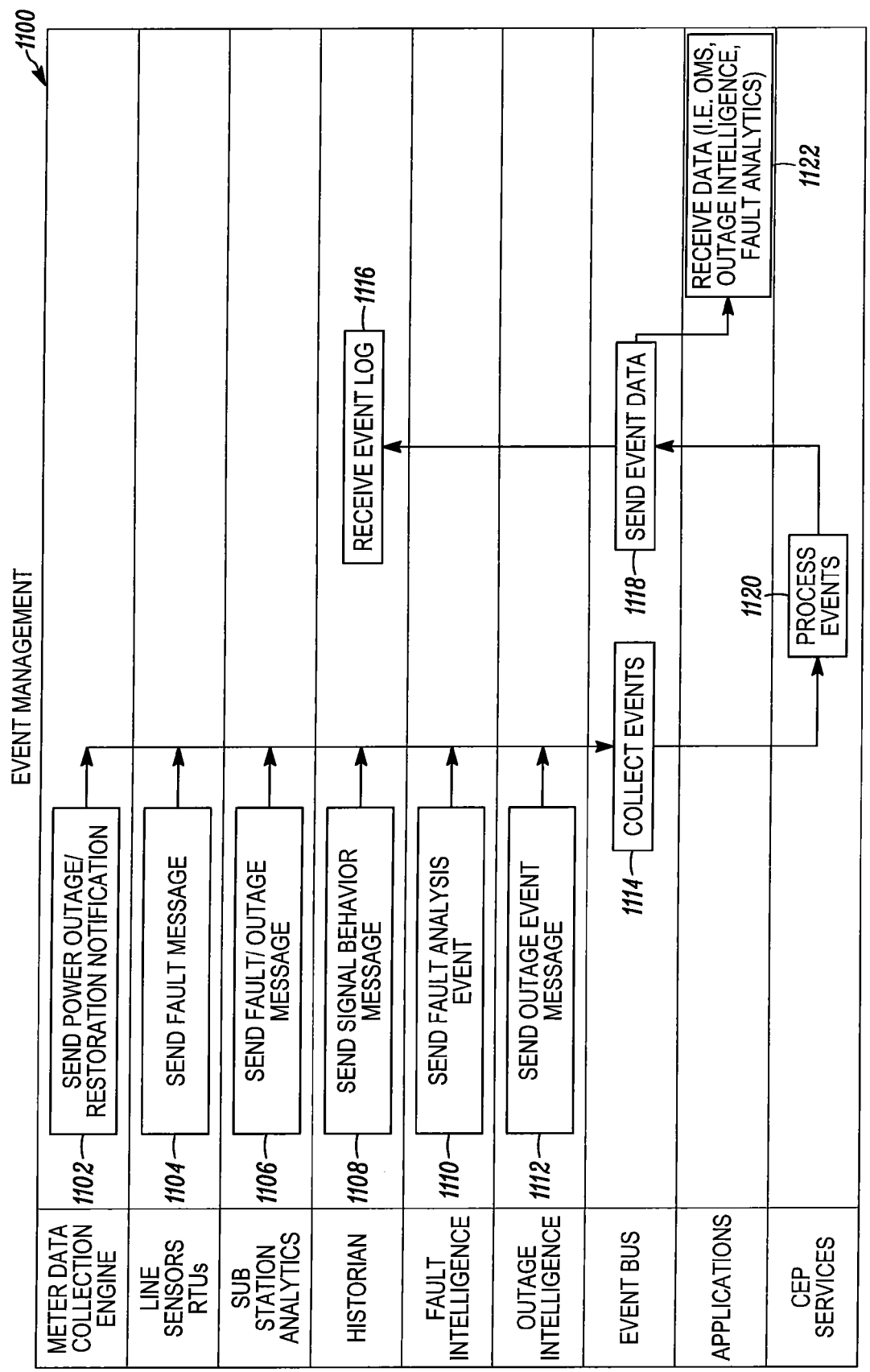
FIG. 11 illustrates a flow diagram of the Event Management processes.

FIG. 11 illustrates a flow diagram 1100 of the Event Management processes. Data may be generated from various devices based on various events in the power grid and sent via the event bus 147. For example, the meter data collection engine may send power outage/restoration notification information to the event bus, as shown at block 1102. The line sensors RTUs generate a fault message, and may send the fault message to the event bus, as shown at block 1104. The substation may analytics may generate a fault and/or outage message, and may send the fault and/or outage message to the event bus, as shown at block 1106. The historian may send signal behavior to the event bus, as shown at block 1108. And, various processes may send data via the event bus 147. For example, the fault intelligence process may send a fault analysis event via the event bus, as shown at block 1110. The event bus may collect the various events, as shown at block 1114. And, the Complex Event Processing (CEP) services may process the events sent via the event bus, as shown at block 1120. The CEP services may process queries against multiple concurrent high speed real time event message streams. After processing by the CEP services, the event data may be sent via the event bus, as shown at block 1118. And the historian may receive via the event bus one or more event logs for storage, as shown at block 1116. Also, the event data may be received by one or more applications, such as the outage management system (OMS), outage intelligence, fault analytics, etc., as shown at block 1122. In this way, the event bus may send the event data to an application, thereby avoiding the "silo" problem of not making the data available to other devices or other applications.

Figure 12A:
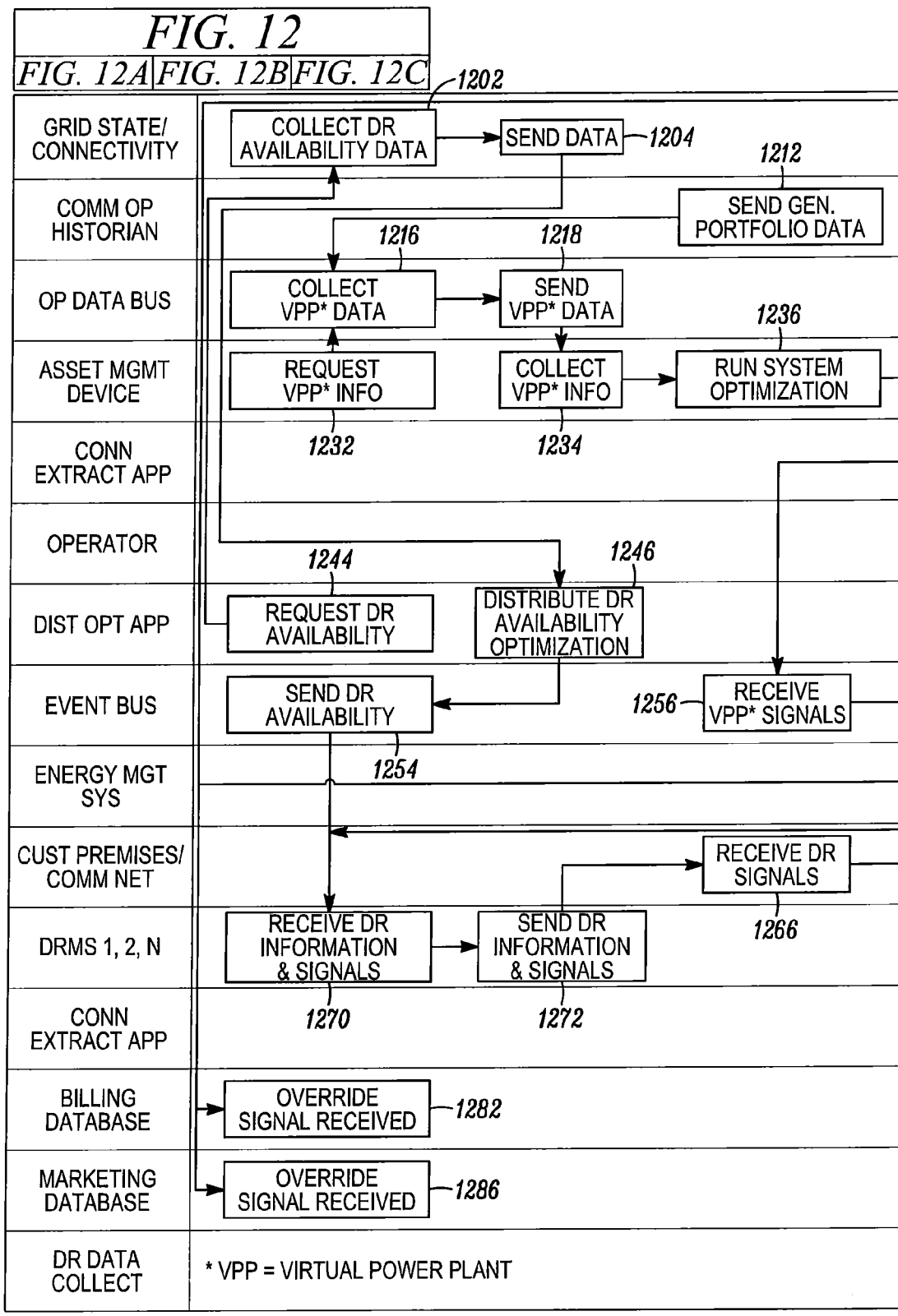
FIG. 12 illustrates a flow diagram of the Demand Response (DR) Signaling processes.
Figure 12B:
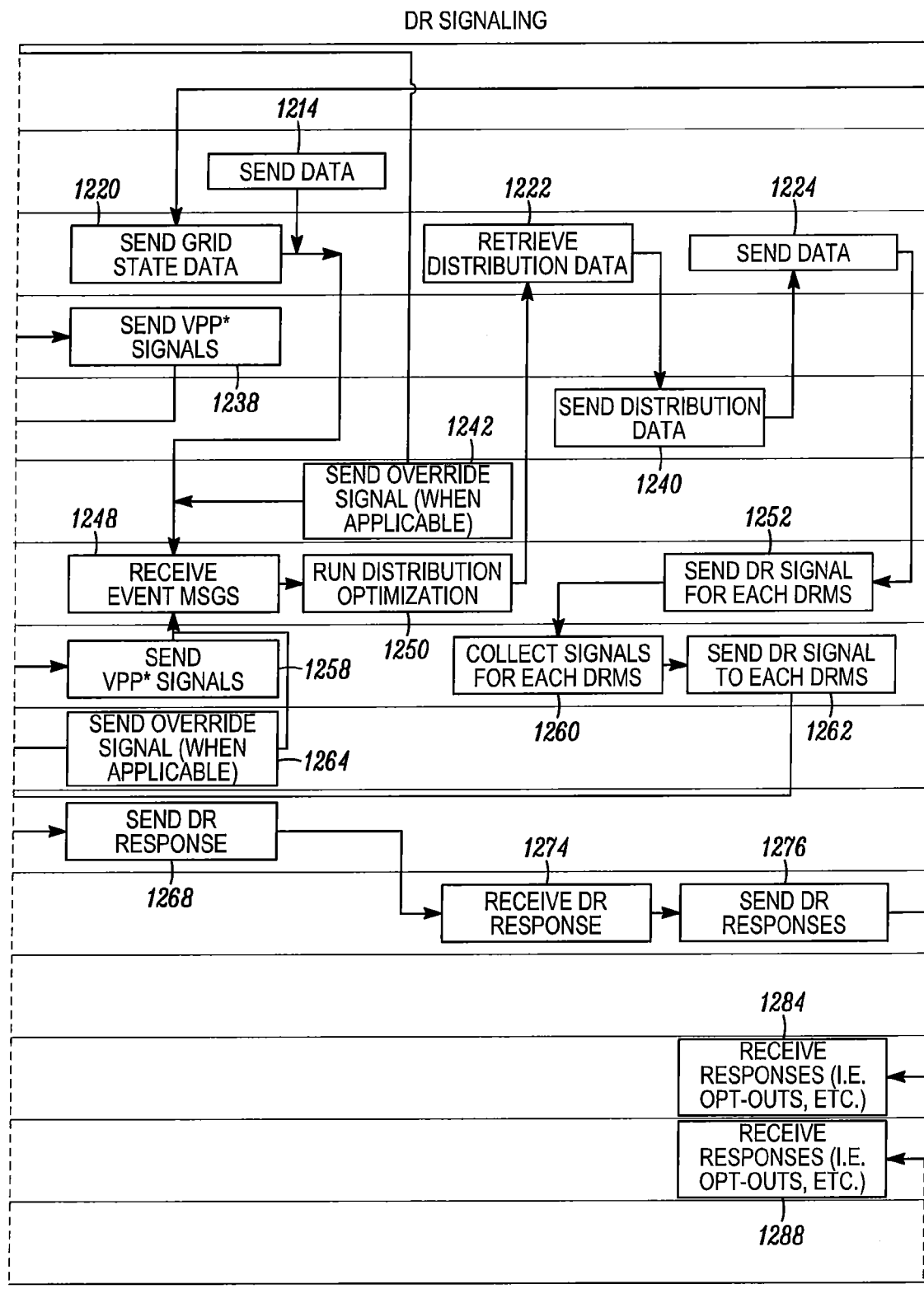
Figure 12C:
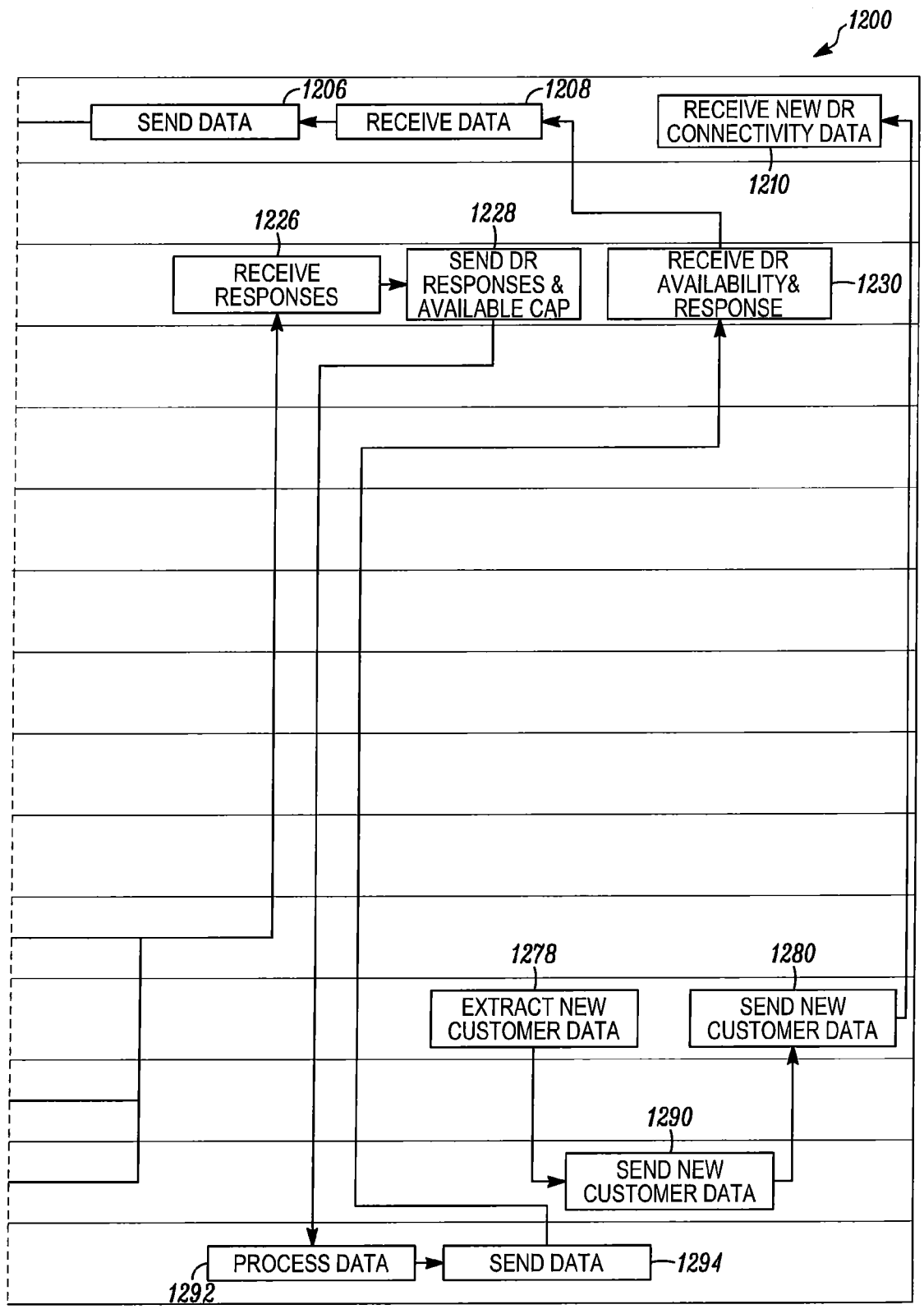

FIG. 12 illustrates a flow diagram 1200 of the Demand Response (DR) Signaling processes. DR may be requested by the distribution operation application, as shown at block 1244. In response, the grid state/connectivity may collect DR availability data, as shown at block 1202, and may send the data, as shown at block 1204. The distribution operation application may distribute the DR availability optimization, as show at block 1246, via the event bus (block 1254), to one or more DR Management Systems. The DR Management System may send DR information and signals to one or more customer premises, as shown at block 1272. The one or more customer premises may receive the DR signals, as shown at block 1266, and send the DR response, as shown at block 1268. The DR Management may receive the DR response, as shown at block 1274, and send DR responses to one, some or all of the operations data bus 146, the billing database, and the marketing database, as shown at block 1276. The billing database and the marketing database may receive the responses, as shown at blocks 1284, 1288. The operations data bus 146 may also receive the responses, as shown at block 1226, and send the DR responses and available capacity to the DR data collection, as shown at block 1228. The DR data collection may process the DR responses and available capacity, as shown at block 1291, and send the data to the operations data bus, as shown at block 1294. The operations data bus may receive the DR availability and response, as shown at block 1230, and send it to the grid state/connectivity. The grid state/connectivity may receive the data, as shown at block 1208. The received data may be used to determine the grid state data, which may be sent (block 1206) via the operations data bus (block 1220). The distribution operation application may receive the grid state data (as an event message for DR optimization), as shown at block 1248. Using the grid state data and the DR availability and response, the distribution operation application may run distribution optimization to generate distribution data, as shown at block 1250. The distribution data may be retrieved by the operations data bus, as shown at block 1222, and may be sent to the connectivity extract application, as shown at block 1240. The operational data bus may send data (block 1224) to the distribution operation application, which in turn may send one or more DR signals to one or more DR Management Systems (block 1252). The event bus may collect signals for each of the one or more DR Management Systems (block 1260) and send the DR signals to each of the DR Management Systems (block 1262). The DR Management System may then process the DR signals as discussed above.

The communication operation historian may send data to the event bus, as shown at block 1214. The communication operation historian may also send generation portfolio data, as shown at block 1212. Or, an application, such as a Ventyx®, may request virtual power plant (VPP) information, as shown at block 1232. The operations data bus may collect the VPP data, as shown at block 1216, and send the data to the application, as shown at block 1218. The application may collect the VPP data, as shown at block 1234, run system optimization, as shown at block 1236, and send VPP signals to the event bus, as shown at block 1238. The event bus may receive the VPP signals, as shown at block 1256, and send the VPP signals to the distribution operation application, as shown at block 1258. The distribution operation application may then receive and process the event messages, as discussed above.

The connection extract application may extract new customer data, as shown at block 1278, to be sent to the Marketing Database, as shown at block 1290. The new customer data may be sent to the grid state/connectivity, as shown at block 1280, so that the grid state connectivity may receive new DR connectivity data, as shown at block 1210.

The operator may send one or more override signals when applicable, as shown at block 1242. The override signals may be sent to the distribution operation application. The override signal may be sent to the energy management system, as shown at block 1264, the billing database, as shown at block 1282, and/or the marketing database, as shown at block 1286.

As previously described, various devices within a utility grid may be controlled via commands generated from INDE CORE 120 or some other command site. The commands may be generated via manual input or may occur through automatic generation. One, some, or all of the devices within the utility grid may receive one or more individual commands for operation in particular manner. For example, smart meters 163 monitoring customer premises 179 may receive respective commands to disconnect, connect, or adjust power being supplied to associated customer premises. Customer premise devices, such as sensors 166 and controls 167, may receive commands to reduce power to a particular device such as a major appliance. Utility customers may agree to have power reduced with regard to particular major appliances or other powered devices for various reasons, such as financial reasons or as part of an eco-friendly load control strategy, for example. Typically, adjusting each device to be disconnected, cycled, or controlled consumer more or less power individually will not result in large effect on the operation of a utility grid. However, if enough devices are controlled in such a manner within a small enough time window, the combined effect of all of the devices operating simultaneously or relatively closely in time could have undesirable effects on the utility grid such as causing or adding to grid instability. For example, if enough customer premise devices are commanded to turn off across a number of customer premises 179 within a relatively small window of time, the reduction in power may cause a wide area blackout. Problems of this nature could arise through inadvertent or coincidental command entry or through malicious activity.

Figure 13:
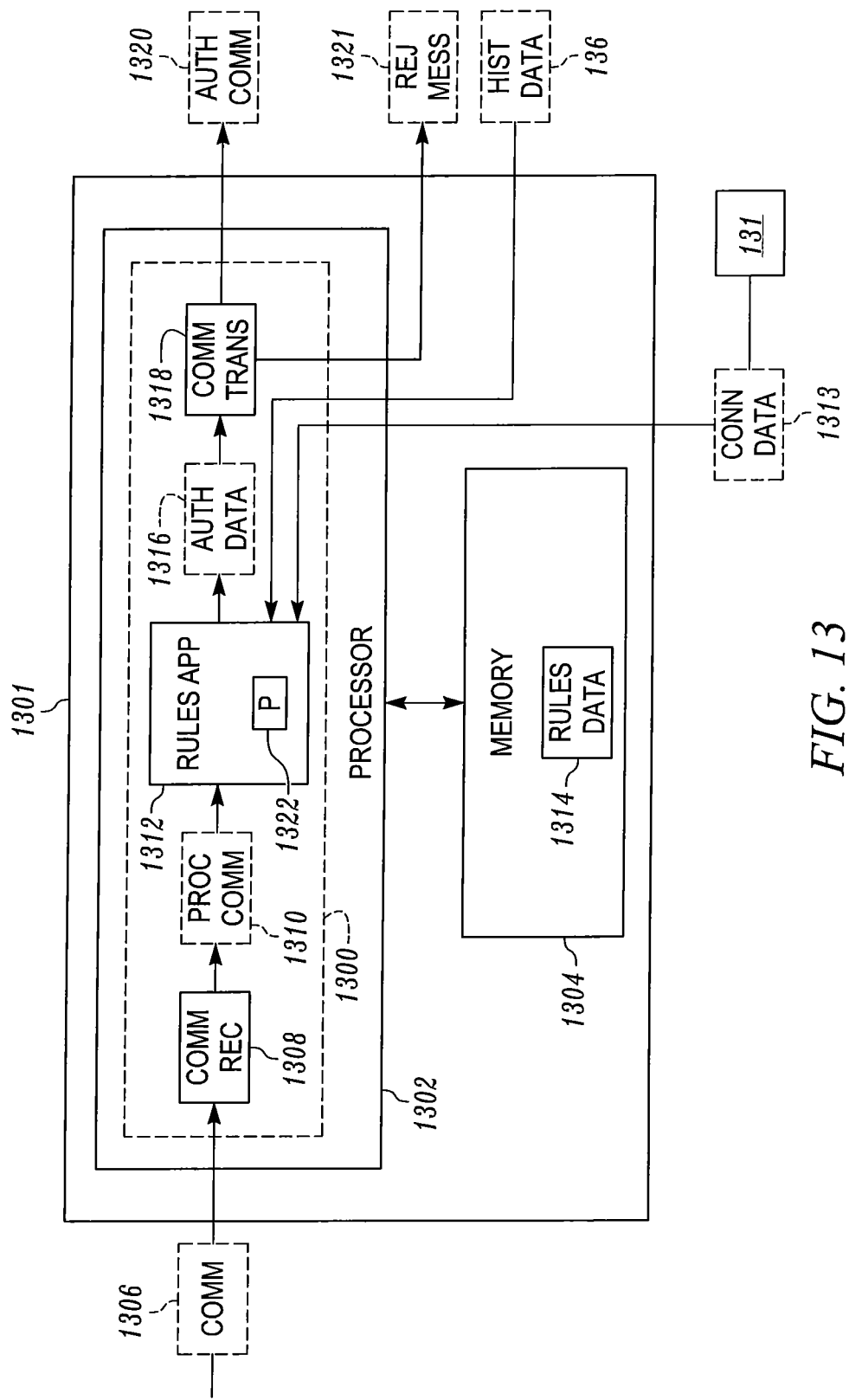
FIG. 13 illustrates a block diagram of an example command filter module.

FIG. 13 is an example of a command filter system including a command filter module 1300 configured to filter commands generated to control various devices within a utility grid. The command filter module 1300 may receive some or all commands for receipt by devices within the utility grid and determine, prior to receipt at the devices, if execution of the commands would result in an undesirable effect within the utility grid. The command filter module 1300 may authorize some or all of the commands for execution and transmit the authorized commands to be received by the respective devices for execution or may prevent unauthorized commands from being received by the respective devices for execution.

In one example, the command filter module 1300 may be executed on one or more computer devices 1301 having a processor 1302 in communication with a memory 1304. The term "module" may be defined to include one or a plurality of executable modules. As described herein, the modules are defined to include software, hardware or some combination thereof executable by the processor 1302. Software modules may include instructions stored in the memory 1304, or other memory device, that are executable by the processor 1302 or other processor. Hardware modules may include various devices, components, circuits, gates, circuit boards, and the like that are executable, directed, and/or controlled for performance by the processor 1302. The memory 1304 may include one or more memories and may be computer-readable storage media or memories, such as a cache, buffer, RAM, removable media, hard drive or other computer readable storage media. Computer readable storage media may include various types of volatile and nonvolatile storage media. Various processing techniques may be implemented by the processor 1302 such as multiprocessing, multitasking, parallel processing and the like, for example. The processor 1302 may include one or more processors.

In one example, the command filter module 1300 may be one or more software modules stored on the memory 1304 and executed by the processor 1302. The command filter module 1300 may include various sub-modules to be executed by the processor 1302. The processor 1302 may be located within INDE CORE 120 or some other site within the utility grid. In one example, the command filter module 1300 may be executed to operate on the event bus 147.

The command filter module 1300 may receive commands 1306 intended to control operation of devices within the utility grid. The commands 1306 may represent commands intended to be executed by respective devices simultaneously or within some predetermined window of time. For example, the commands 1306 may be intended for receipt by devices within a customer premise 179 connected to the sensors 166, controls 167, or an in-home display 165.

Figure 14:
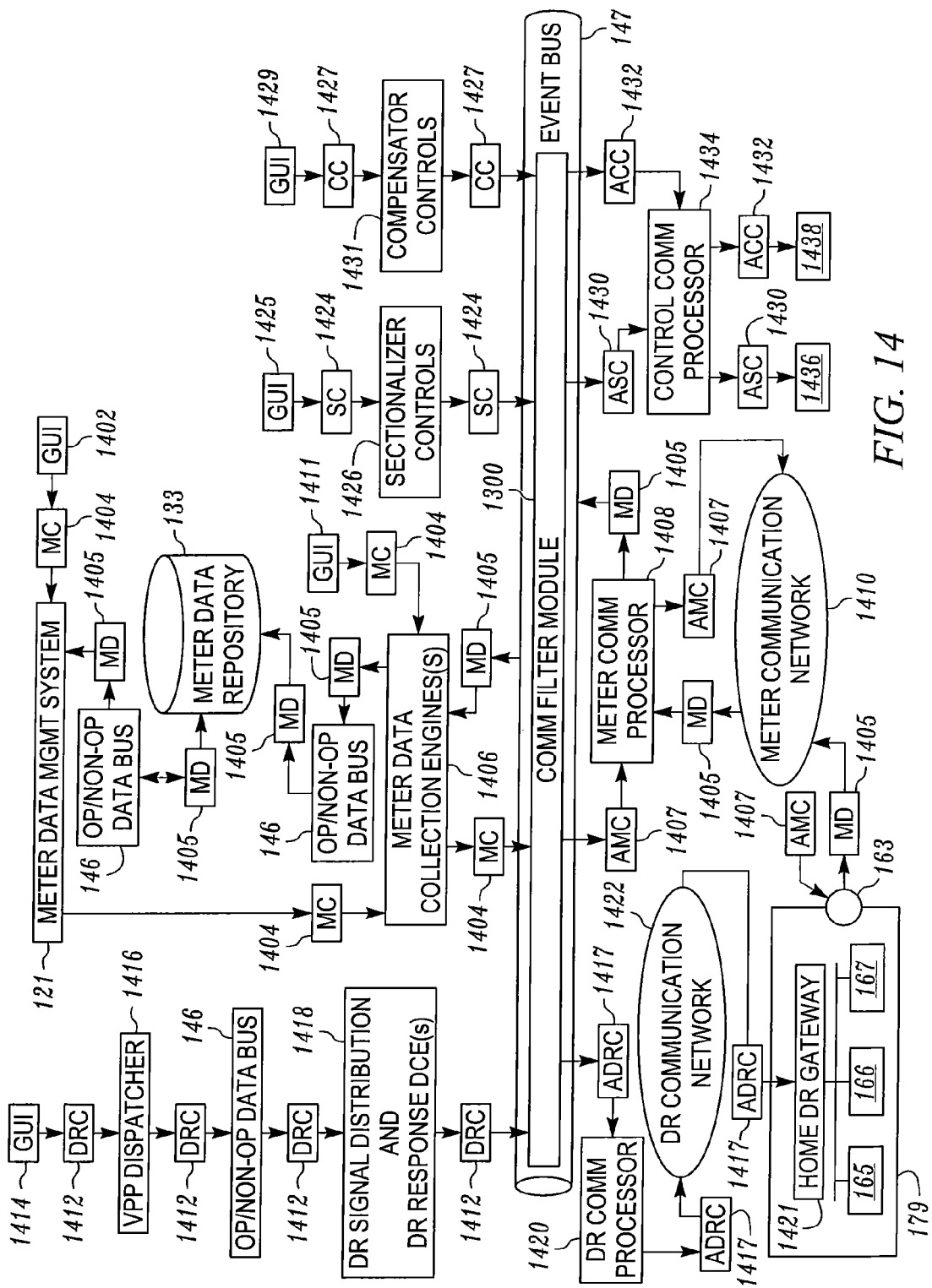
FIG. 14 illustrates the example command filter module of FIG. 13 implemented on a utility grid.

Referring now to FIG. 14, an example of the command filter module 1300 configured to be executed on the real time complex event processing bus 147 is shown. The example of FIG. 14 may be implemented in the INDE architecture described with regard to FIGS. 1-6. As shown in FIG. 14, various devices within the utility grid may be implemented via manual control. For example, a graphical user interface (GUI) 1402 may be used by an operator to transmit meter commands ("MC") 1404, such as connect/disconnect meter commands, to be received by various smart meters 163 within the smart meter network 178. The meter commands 1404 may be communicated through devices capable of transmitting meter data 1405 received from the smart meters 163. The GUI 1402 may transmit the meter commands 1404 to the meter data management system 121. The meter commands 1404 may then be received by a meter data collection engine 1406, which may be software modules, hardware modules, or a combination configured to collect data, commands, events, and any other data regarding smart meters 163 within the utility system. In one example, the meter data collection engine 1406 may reside on the meter data collection head end(s) 153. In an alternative example, the meter data collection engine 1406 may be distributed such that a plurality of meter data collection engines 1406 exists within a utility grid. Data collected by the meter data collection engine 1406 may be transmitted to and stored by one or more meter data repository 133 communicated over the operational/non-operational data bus 146.

The meter commands 1404 may be received by the event bus 147 and the command filter module 1300. The command filter module 1300 may analyze the meter commands 1404 to determine if, upon execution, the commands could cause an undesirable effect within the utility grid. The command filter module 1300 may transmit authorized meter commands ("AMC") 1407 for receipt and execution by respective smart meters 163. The authorized meter commands 1407 may be transmitted to a meter command processor 1408. The meter command processor 1408 may determine the content and intended recipient of the authorized meter commands 1407. The meter command processor 1408 may transmit the commands to a meter communication network 1410. The meter communication network 1410 may be configured to transmit meter data, meter events, and meter commands to all or some of the smart meters 163 coupled to the smart meter network 178 within the utility grid. The authorized meter commands 1407 may ultimately be received by the smart meters 163 at the customer premises 179 for connection or disconnection from the utility grid. A GUI 1411 may receive meter commands 1404 to be directly transmitted to the meter data collection engine 1406.

The various customer premise devices may receive DR commands ("DRC") 1412 that are authorized by the command filter module 1300. For example, GUI 1414 may be used by an operator to manually enter the DR commands 1412. The DR commands 1412 may be received from the GUI 1414 by a VPP dispatcher system 1416. The DR commands 1412 may be based on various considerations such as pricing, environmental factors, and load control. The VPP dispatcher system 1416 may be configured to receive the DR commands 1412 and determine customer premises devices to be controlled based on the DR commands 1412. The DR commands 1412 may be received by the operation/non-operation data bus 146. In other examples, the DR commands 1412 may be transmitted from the VPP dispatcher system 1416 to the event bus 147.

The DR commands 1412 may be received from the operation/non-operation data bus 146 by a DR signal distribution and DR response and data collection engine (DCE) system 1418. The DR signal distribution and DR response data collection engine 1418 may be configured to operate within INDE CORE 120, such as within the DR management system 154, or at some other site within or remote from the utility grid. The DR commands 1412 may be analyzed by the DR signal distribution and DR response and DCE system 1418 to determine how the desired demand response should be performed, such as determining the particular devices to receive the commands. The DR signal distribution and DR response and DCE system 1418 may divide up DR commands 1412 for individual devices or device groups depending.

The DR commands 1412 may then be received by the event bus 147 and the command filter module 1300 to determine if the DR commands 1412 are authorized to be executed by devices within the customer premises 179. If the DR commands 1412 are to be executed by the devices within the customer premises 179, authorized DR commands ("ADRC") 1417 may be transmitted by the command filter module 1300 to a DR command processor 1420. The DR command processor 1420 may determine the content of the authorized DR commands 1417 and identify the particular customer premise 179 and devices within the particular customer premise 179 to receive the authorized DR commands 1417. The authorized DR commands 1417 may be transmitted by the DR command processor 1420 to a DR communication network 1422 that may be interconnected with all or some of the customer premises 179 within a utility grid. The authorized DR commands 1417 may be received by the intended devices within each customer premises 179 and may be distributed by a home DR gateway 1421.

Other types of commands may be manually input into the utility grid, such as switching commands. For example, switching commands ("SC") 1424 may be entered by an operator through a GUI 1425. In one example, the switching commands 1424 may be intended to connect or disconnect switching devices 1436 within a utility grid, such as sectionalizers, reclosers, and inter-ties, for example. The switching commands 1424 may be received by sectionalizer controls 1426 that may be configured to process the switching commands 1424 and determine the particular devices in the utility grid that may be operated in order to execute the switching commands. The switching commands 1424 may be received by the event bus 147 and processed by the command filter module 1300. Authorized switching commands ("ASC") 1430 may be transmitted to one or more control command processors 1434. The control command processors 1434 may transmit the authorized switching commands 1430 to the respective switching devices 1436 intended to receive a particular authorized switching command 1430.

Compensator commands ("CC") 1427 may be entered by an operator through GUI 1429. The compensator commands 1427 may be intended for receipt by devices used to compensate utility grid conditions such as capacitors, line drop compensators, load tap changers (LTCs), and voltage regulators, for example. The compensator commands 1427 may be received by compensator controls 1431 configured to determine the content of the compensator commands 1427 and format the compensator commands 1427 for receipt by the particular compensator devices intended to receive the compensator commands 1427. The compensator commands 1427 may be transmitted by the compensator controls 1431 to the event bus 147 to be processed by the command filter module 1300. Authorized compensator commands ("ACC") 1432 may be transmitted to the control command processors 1434. The control command processors 1434 may provide the authorized compensator commands 1432 to the intended compensator devices 1438.

Referring back to FIG. 13, the detailed operation of the command filter module 1300 may be explained further. The commands 1306 may include device commands such as the meter commands 1404, DR commands 1416, switching commands 1424, and the compensator commands 1427. Upon receipt by the command filter module 1300, the commands 1306 may be received by a command receipt module 1308. The command receipt module 1308 may process the commands 1306 to determine the content of desired recipient of each of the commands 1306. The command receipt module 1308 may provide processed commands 1310 to a rules application module 1312. The processed commands 1310 may include additional data relating to the processing performed by the command receipt module 1308, a reformatting of the commands 1306, or both.

Upon receipt of the processed commands 1310, the rules application module 1312 may apply a set of predetermined rules to the processed commands 1310 to authorize, if any, commands 1306 for execution. The rules application module 1312 may retrieve a rules data set 1314 containing one or more rules for application to the processed commands 1310. Based on application of the rules, the rules application module 1312 may determine which commands 1306 of the processed commands 1310 are authorized for execution. The rules application module 1312 may authorize some of the processed commands 1310 for execution or may authorize the processed commands 1310 in bulk, such that all of the commands being analyzed by the rules application module 1312 are either authorized or rejected together.

Upon authorization, the rules application module 1312 may generate an authorization data set 1316 containing the commands 1306 along with the authorization decision of the rules application module 1312. The authorization data set 1316 may be received by a command transmit module 1318. The command transmit module 1318 may identify one, some, or all of the commands authorized for execution by a respective device. Upon the identification, the command transmit module 1318 may transmit authorized commands 1320 to be ultimately received by the intended device. For commands not authorized for execution, the command transmit module 1318 may generate a rejection message 1321 for each unauthorized command to be transmitted back to where the unauthorized command originated for notification, such as one of the GUIs 1402, 1411, 1414, and 1425. In one example, the command filter module 1300 may be executed on the event bus 147, allowing the command filter module 1300 to transmit the authorized commands 1320 or allow the event bus 147 to perform the transmission.

The rules contained in the rules data set 1314 may be static in nature or may be dynamic based on real-time conditions within the utility grid. Static rules may be unchanging regardless of the current utility grid example. For example, a static rule may exist limiting the number of devices that may be connected or disconnected within a predetermined window of time, such as the smart meters 163, devices within customer premises 179, switching devices 1436, or compensator devices 1438, or any combination. In one example, a rule may be directed towards limiting the number of instances customer premise devices (e.g., industrial pumps) may be started, such as six starts per hour. In another example, a rule may be directed towards limiting the number of smart meters 163 that may be turned on or off within a predetermined amount of time. Other rules may apply regarding the duration in which a device may be commanded to be connected or disconnected.

The rules application module 1312 may also be configured to apply the rules of the rules data set 1314 with consideration towards the dynamic nature of a utility grid. The rules application module 1312 may be configured to look at historical operation data of the utility grid. In one example, the rules application module 1312 may be configured to retrieve information from the historical data 136. The rules application module 1312 may apply a rule from the rules data set 1314 to the processed commands 1310 while cross-referencing the historical data 136. For example, the rules data set 1314 may include a rule based on the number of device disconnections/connections irrespective of a particular device. For example, only a predetermined number of devices may be allowed to be disconnected or connected within a predetermined amount of time regardless of the devices involved. If the commands 1306 are directed towards disconnecting or connecting more devices than the device number threshold, the command filter module 1300 may analyze historical data 136 to determine if previous command patterns such as those of the commands 1306 resulted in undesirable effects within the utility grid. If, based on the historical data, the connecting or disconnecting of the particular devices to which the commands correspond, did not previously cause any adverse issues in the utility grid, the commands may be authorized for execution.

In a rules application configuration using dynamic conditions, the rules application module 1312 may also retrieve connectivity data 1313 from the connectivity datamart 131 during application of the rules. Based on the historical data 136, connectivity data 131, and the rules data set 1314, the rules application module 1312 may determine if the current utility grid conditions will be undesirably affected to a degree that the commands 1306 should not be authorized for execution. In one example, the rules application module 1312 may include a prediction module 1322 to determine command authorization based on the historical data 136, connectivity data 1313, and the rules data set 1314. The prediction module 1322 may predict the effect on the utility grid by the authorization of some or all of the commands. The prediction module 1322 may generate predicted effects regarding utility grid behavior based on various permutations of combinations of the commands 1306. In one example, the prediction module 1322 may select a combination of commands 1306 for authorization identified as the greatest number of commands 1306 to be executed. In other examples, the prediction module 1306 may identify commands 1306 based on other considerations such as closest to and less than a grid disturbance threshold. The grid disturbance threshold may represent the minimum disturbance allowed on the utility grid when executing device commands, such as the commands 1306. In alternative configurations, various conditions, static or dynamic may be monitored performing authorization decisions regarding the commands 1306. For example, voltage conditions, current conditions, or both may be monitored at strategic portions of the utility grid. Environmental conditions may be monitored as well, such as ambient temperature.

Figure 15:
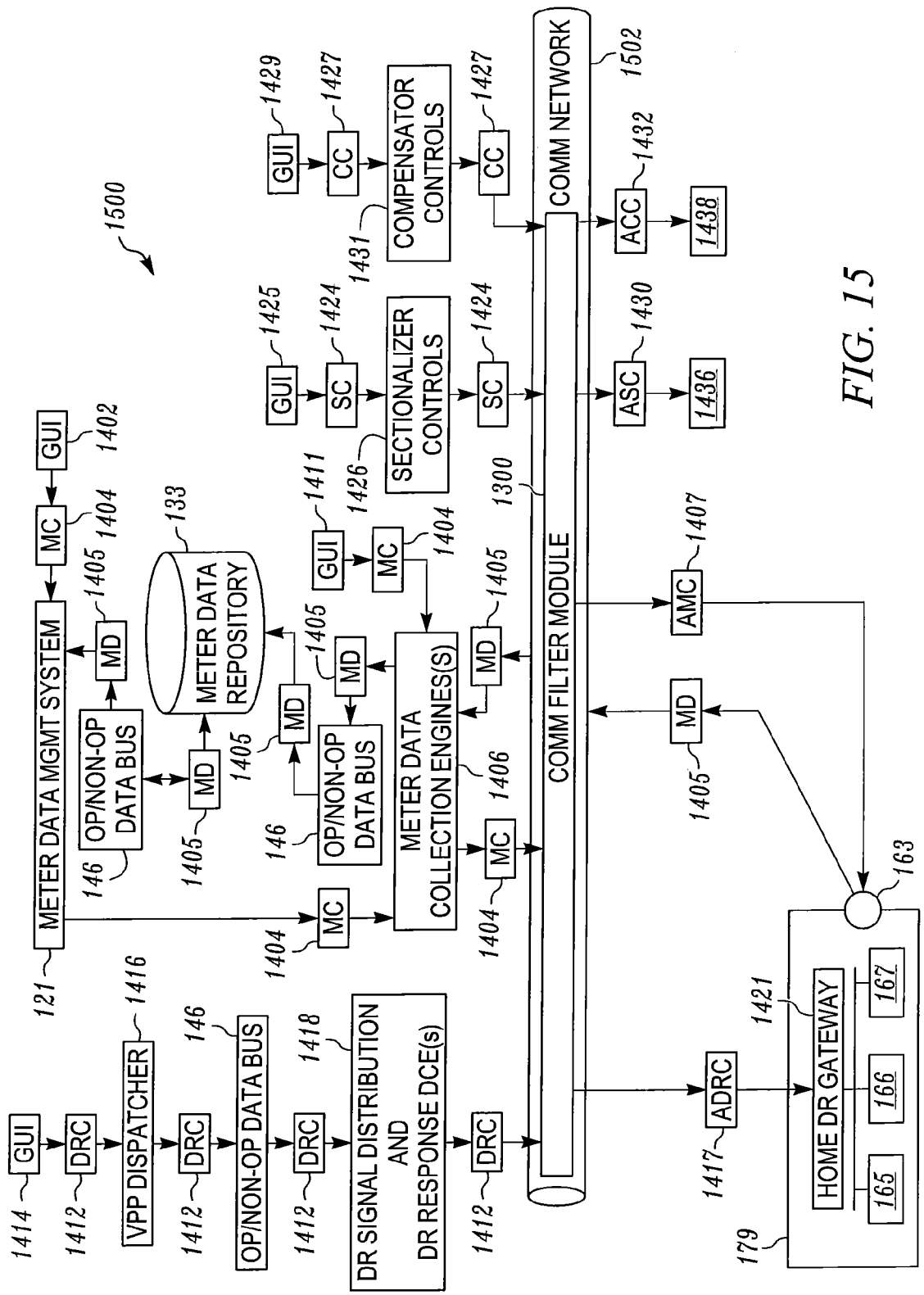
FIG. 15 illustrates the example command filter module of FIG. 13 implemented on another utility grid.
Figure 16:
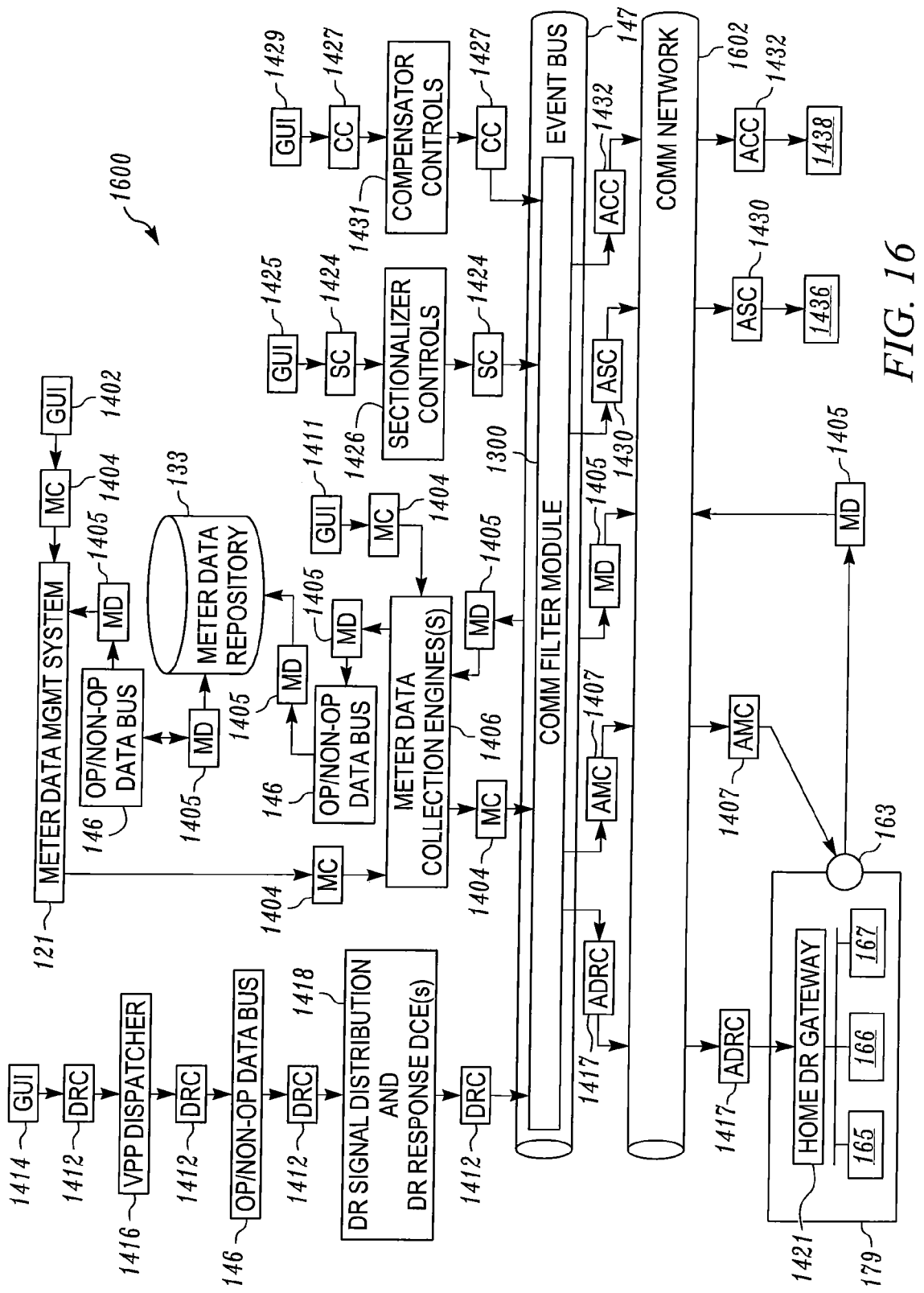
FIG. 16 illustrates the example command filter module of FIG. 13 implemented on another utility grid.
Figure 17:
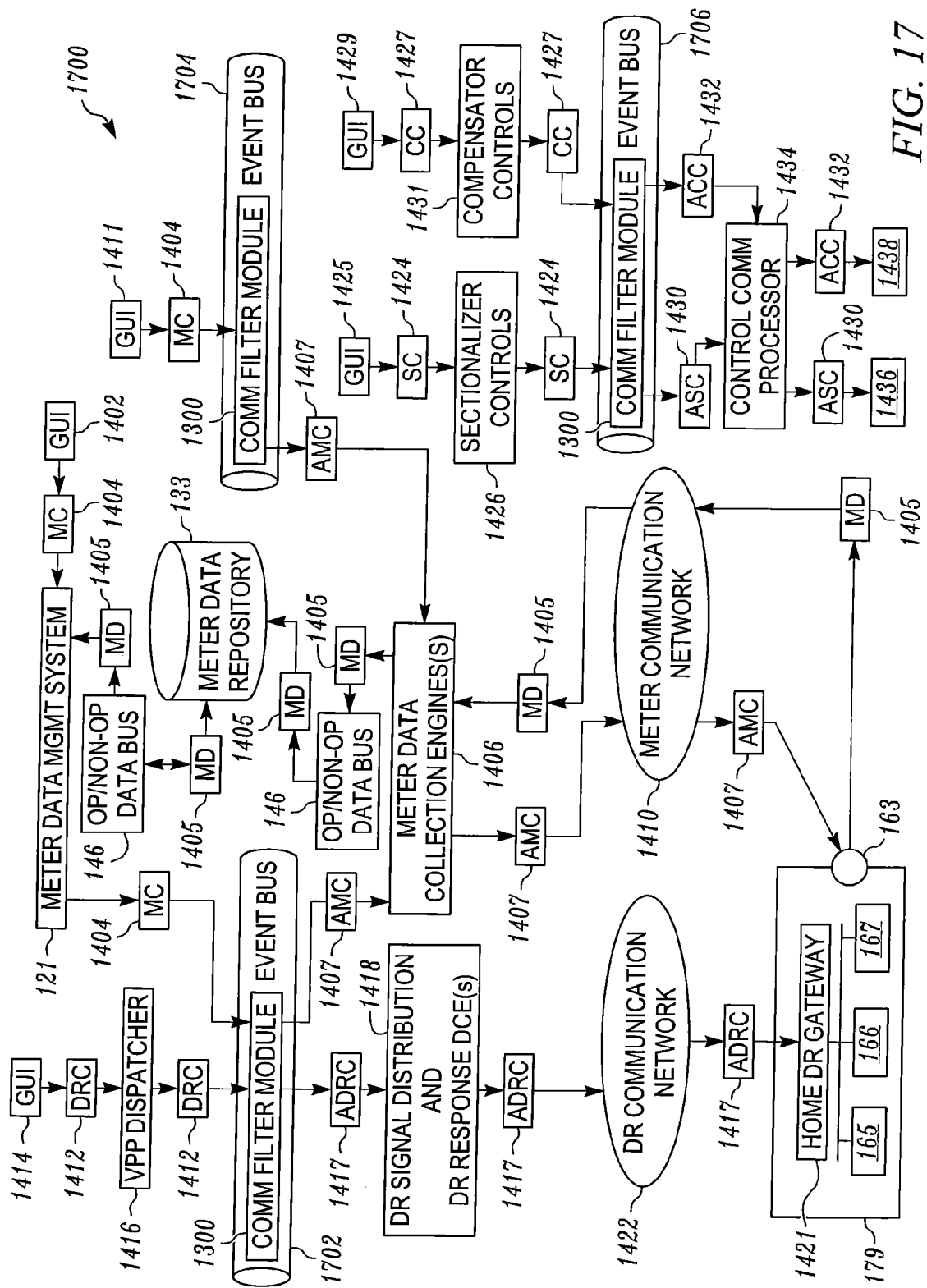
FIG. 17 illustrates the example command filter module of FIG. 13 implemented on another utility grid.

Pre-configured utility grids may have different communication access points when being retrofitted with smart devices. Pre-configured utility grids may also include established communication networks different from that described with regard to FIG. 14. FIGS. 15-17 illustrate example utility grids having alternative communication network configurations. In FIGS. 15-17, the command filter module 1300 may be executed at different portions in the utility grid with respect to devices configured to receive connect/disconnect commands, for example. In FIG. 15, a utility grid 1500 similar to the configuration of FIG. 1 may be configured with a single communication network bus 1502 instead of distributed communication networks, such as the DR communication network and meter communication network. In FIG. 15, the command filter module 1300 may be executed to operate on the communication network bus 1502. The configuration of FIG. 15 is similar to the FIG. 13 in that the initial commands may be processed similarly prior to reaching the command filter module 1300. However, upon providing authorization determinations, the command module 1300 may transmit the authorized meter commands 1407 directly to the particular smart meter 163, the authorized DR commands 1417 to the devices of the customer premises 179, the authorized switching commands 1430 to the switching devices 1436 and authorized compensator commands 1432 to the compensator devices 1438. The communication network bus 1502 may be configured to interact with the command filter module 1300 not only to execute the command filter module 1300 but to direct the authorized commands to the respective device for execution.

FIG. 16 is a schematic of a utility grid 1600. In the utility grid 1600, a single communication network bus 1602 may be implemented. The communication network bus 1602 may be implemented by a third party provider or may be included in the utility grid 1600. The event bus 147 may communicate with the communication network bus 1602. The event bus 147 may execute the command filter module 1300 and receive the commands 1404, 1412, 1424, and 1427. The authorized commands 1407, 1417, 1430, and 1432 may be distributed by the communication network bus 1602 to the various devices intended to receive the various device commands. The communication network bus 1602 may recognize the intended recipient of the authorized commands and transmit the authorized commands accordingly.

FIG. 17 is a schematic of a utility grid 1700. In the utility grid 1700, a distributed event bus is used. The distributed event bus may include event buses 1702, 1704, and 1706, which may each perform in a manner similar to that described with regard to the event bus 147. One difference is that the distributed event buses 1702, 1704, and 1706 are not in communication with one another. In FIG. 17, the event bus 1702 is configured to execute the command filter module 1300 for the meter commands 1404 and DR commands 1412. The meter commands 1404 may be processed by the command filter module 1300 in a manner such as that described with regard to FIG. 13. The authorized meter commands 1407 may be transmitted to the meter data collection engine 1406, which may transmit the commands to the meter communication network 1410. The authorized meter commands 1407 may be transmitted by the meter communication network 1410 to the intended smart meter 163. Similarly, the event bus 1704 may also receive the meter commands 1404 from the GUI 1411. The command filter module 1300 of the event bus 1704 may authorize the meter commands 1404 and transmit the authorized meter commands 1407 to meter data collection engine 1406.

The authorized DR commands 1417 may be transmitted to the DR signal distribution and DR response DCE 1418. The DR signal distribution and DR response DCE 1418 may transmit the authorized DR commands 1417 to the DR communication network 1422 for subsequent transmission to the relevant customer premise device via the home DR gateway 1421. The switching commands 1424 and the compensator commands 1427 may be received by the event bus 1706 and filtered by the command filter module 1300. Authorized switching commands 1430 and authorized compensator commands 1432 may be transmitted to the control command processors 1427 and subsequently routed to the relevant devices.

Figure 18:
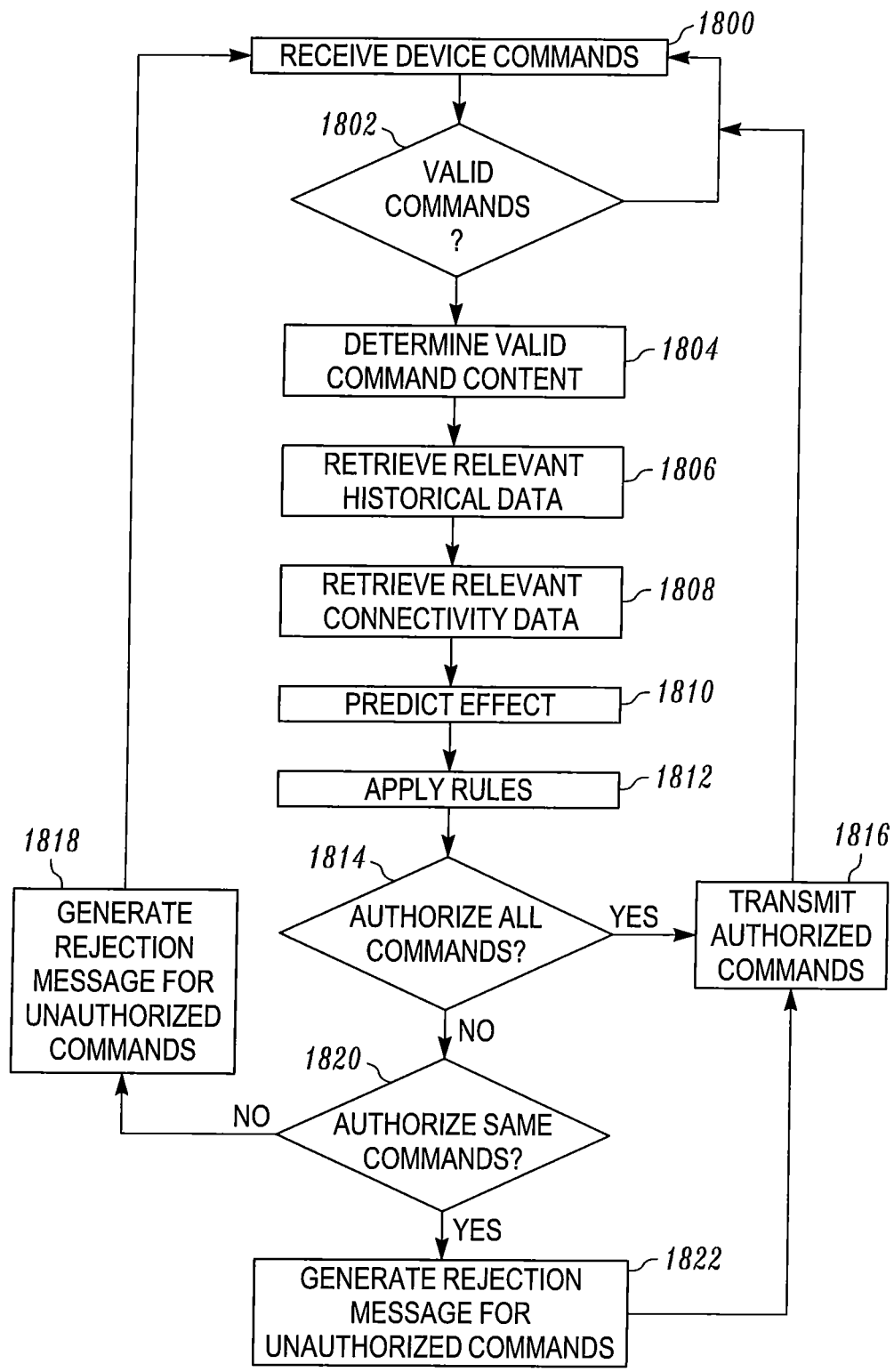
FIG. 18 illustrates an example operation flow diagram of the example command filter module of FIG. 13.

FIG. 18 is an example operational flow of the command filter module 1300. The command filter module 1300 may receive device commands (block 1800), such as the commands 1306. The command filter module 1300 may determine if the received commands are invalid (bloc 1802). If one or more of the commands 1306 are invalid, the command filter module 1300 may monitor for receipt of subsequent device commands. In alternative examples, the command filter module 1300 may generate an invalidity message for each command of the commands 1306 deemed invalid. An invalidity message may be transmitted by the command filter module 1300 to the source of command, such as to a GUI used to input the commands. A sub-module of the command filter module 1300 may generate an invalidity message, such as the command receipt module 1308.

The command filter module 1300 may determine the content of each valid command 1306 (block 1804). The determination may be performed by the command receipt module 1308. Upon determination of the content of the valid commands 1306, the command filter module 1300 may retrieve relevant historical data from the historical data 136 (block 1806). The command filter module 1300 may also retrieve the relevant connectivity data 1313 from connectivity data datamart 131 (block 1808). Upon receipt of the connectivity data 1313, rules application module 1312 may implement the prediction module 1322 (block 1810) to determine the possible effect of the executing the commands 1306.

The rules application module 1312 may apply the relevant rules from the rules data set 1314 (block 1812) to determine if the predicted results violate any of the rules. The decision to authorize all commands 1306 (block 1814) may be performed by the rules application module 1312. If all of the commands 1306 are authorized, the commands 1306 may be transmitted by the command transmit module 1318 to be received by the respective devices (block 1816). If all of the commands 1306 are not authorized, a decision may be made to determine if some of the commands are authorized (block 1818). If none of the commands 1306 are authorized, rejection messages 1321 may be generated by the command transmit module 1320 (block 1820) and transmitted to an origination source of the respective commands 1306. If some of the commands 1306 are to be authorized, the rejection messages 1321 may be transmitted for the unauthorized commands 1306 by the command transmit module 1318 (block 1822) and the authorized commands may be transmitted to be received by the respective device.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

What is claimed is:

1. An utility grid command filter system comprising:
    a memory configured to store a plurality of device command rules; and
    a command filter module stored on the memory and executable by a processor configured to:
        receive a plurality of commands, wherein each of the plurality of commands is received from a respective origination device, and wherein each of the plurality of commands is configured to provide a command for execution by a respective device electrically coupled to a utility grid;
        retrieve at least one device command rule from the plurality of device command rules;
        retrieve utility grid historical data corresponding to operation of the respective device according to past execution of the plurality of commands;
        determine when at least one command of the plurality of commands is authorized for execution by the respective device based on the at least one device command rule and the utility grid historical data; and
        transmit the at least one command to be received by the respective device only when the at least one command is determined to be authorized for execution by the respective device.

2. The utility grid command filter system of claim 1, wherein the command filter module is further executable to generate a rejection message configured to be received by the respective origination device when the at least one command is determined to be unauthorized for execution by the respective device, wherein the rejection message is indicative of the at least one command being unauthorized for execution by the respective device.

3. The utility grid command filter system of claim 1, wherein the command filter module is further executable to:
    retrieve utility grid connectivity data corresponding to current operating conditions of the utility grid; and
    determine when at least one command of the plurality of commands is authorized for execution by the device based on the utility grid connectivity data.

4. The utility grid command filter system of claim 3, wherein the command filter module is further executable to:
    determine at least one predicted utility grid effect from authorization of the at least one command based on the utility grid historical data and the utility grid connectivity data; and
    determine when at least one command of the plurality of commands is authorized for execution by the device based on the at least one predicted effect.

5. The utility grid command filter system of claim 4, wherein the at least one device command rule is a minimum utility grid disturbance threshold, where the command filter module is further executable to determine when the at least one command of the plurality of commands is authorized for execution by the device when the predicted effect is less than the minimum utility grid disturbance threshold.

6. The utility grid command filter system of claim 1, wherein the at least one device command rule comprises limiting device connection to a predetermined number of devices within a predetermined amount of time.

7. The utility grid command filter system of claim 1, wherein the at least one device command rule comprises limiting restart of a device to a predetermined number of times within a predetermined amount of time.

8. A utility grid system comprising:
    a plurality of electrically-coupled devices; and
    a command filter system including at least one processor configured to:
        receive a plurality of commands, wherein each of the plurality of commands is received from a respective origination device, and wherein each of the plurality of commands is configured to provide a command for execution by a respective device of the plurality of electrically-coupled devices;
        retrieve at least one device command rule from a plurality of device command rules;
        retrieve utility grid historical data corresponding to operation of the respective device according to past execution of the plurality of commands;
        determine when at least one command of the plurality of commands is authorized for execution by the respective device based on the at least one device command rule and the utility grid historical data; and
        transmit the at least one command to be received by the respective device only when the at least one command is determined to be authorized for execution by the respective device; and
    a communication network configured to relay the at least one command from the command filter system to the respective device.

9. The utility grid of claim 8 further comprising:
    an event bus configured to execute the command filter system;
    wherein the plurality of electrically-coupled devices comprises a first device having a first predetermined function within the utility grid and a second device having a second predetermined function within the utility grid, wherein the second predetermined function is different than the first predetermined function;
    wherein the at least one command comprises a first command and a second command, wherein the first command corresponds to the first device and the second command corresponds to the second device;
    wherein the communication network comprises a first communication sub-network and a second communication sub-network;
    wherein the command filter system is configured to:
        determine when the first command is authorized for execution by the first device based on the at least one device command rule; and
        determine when the second command is authorized for execution by the respective device based on the at least one device command rule;
    wherein the first communication sub-network is configured to relay the first device command to the first device when the first command is authorized for execution; and
    wherein the second communication sub-network is configured to relay the second command to the second device when the second command is authorized for execution.

10. The utility grid of claim 8, wherein the plurality of electrically-coupled devices comprises a first device having a first predetermined function within the utility grid and a second device having a second predetermined function within the utility grid, wherein the second predetermined function is different than the first predetermined function;
    wherein, the at least one command comprises a first command and a second command, wherein the first command corresponds to the first device and the second command corresponds to the second device;

wherein the command filter system is configured to:
   determine when the first command is authorized for execution by the first device based on the at least one device command rule; and
   determine when the second command is authorized for execution by the respective device based on the at least one device command rule; and
wherein the communication network comprises a communication network bus, wherein the command filter system is configured to be executed on the communication network bus;
wherein the communication network bus is configured to relay the first device command to the first device when the first command is authorized for execution; and
wherein the communication network bus is configured to relay the second command to the second device when the second command is authorized for execution.

11. The utility grid of claim 8 further comprising:
an event bus configured to execute the command filter system;
wherein the plurality of electrically-coupled devices comprises a first device having a first predetermined function within the utility grid and a second device having a second predetermined function within the utility grid, wherein the second predetermined function is different than the first predetermined function;
wherein, the at least one command comprises a first command and a second command, wherein the first command corresponds to the first device and the second command corresponds to the second device;
wherein the command filter system is configured to:
   determine when the first command is authorized for execution by the first device based on the at least one device command rule; and
   determine when the second command is authorized for execution by the respective device based on the at least one device command rule; and
wherein the communication network comprises a communication bus configured to:
   receive the first device command to the first device from the event bus when the first command is authorized for execution;
   receive the second command to the second device from the event bus when the second command is authorized for execution; and
   relay the received first command to the first device and the received second command to the second device.

12. The utility grid of claim 8 further comprising:
a first event bus and second event bus, wherein the command filter system comprises a first command filter system and second command filter system, where the first command filter system is configured to be executed on the first event bus and the second command filter system is configured to be executed on the second event bus;
wherein the plurality of electrically-coupled devices comprises a first device having a first predetermined function within the utility grid and a second device having a second predetermined function within the utility grid, wherein the second predetermined function is different than the first predetermined function;
wherein, the at least one command comprises a first command and a second command, wherein the first command corresponds to the first device and the second command corresponds to the second device;
wherein the first command filter system is configured to determine when the first command is authorized for execution by the first device based on the at least one device command rule;
wherein the second command filter system is configured to determine when the second command is authorized for execution by the respective device based on the at least one device command rule;
wherein the communication network comprises a first communication sub-network and a second communication sub-network, wherein the first communication sub-network is configured to:
   receive the first device command from the first command filter system when the first command is authorized for execution; and
   relay the received first device command to the first device; and
wherein the second communication sub-network is configured to:
   receive the second device command from the second command filter system when the second command is authorized for execution; and
   relay the received second device command to the second device.

13. A non-transitory computer-readable medium comprising a plurality of instructions executable by a processor of a computing device, the computer-readable medium comprising:
   instructions to direct the processor to receive a plurality of device commands, where each device command is configured to be executed by a respective device of a plurality of devices interconnected to a utility grid;
   instructions to direct the processor to retrieve a set of command rules from memory;
   instructions to direct the processor to retrieve utility grid historical data corresponding to operation of the respective device according to past execution of the plurality of commands;
   instructions to direct the processor to apply the set of command rules and the utility grid historical data to the plurality of device commands to determine when the plurality of device commands are authorized for execution by the respective device;
   instructions to direct the processor to transmit each of the plurality of device commands for execution by the respective device only when the plurality of device commands comply with the set of command rules; and
   instructions to direct the processor to prevent each of the plurality of device commands from being executed by the respective device when the plurality of device commands fail to comply with at least one command rule of the set of command rules.

14. The computer-readable medium of claim 13, further comprising:
   instructions to transmit a first portion of the plurality of device commands for execution by the respective device, wherein the portion of the plurality of device commands comply with the set of command rules; and
   instructions to prevent a second portion of the plurality of device commands for execution by the respective device, wherein the second portion of the plurality of device commands fail to comply with the set of command rules.

15. The computer-readable medium of claim 13, further comprising:
   instructions to transmit a first portion of the plurality of device commands for execution by the respective device when the first portion of the plurality of device commands are less than a predetermined command number threshold.

16. The computer-readable medium of claim 13, further comprising:
   instructions to predict an effect on the utility grid due to authorization of the plurality of commands; and
   instructions to transmit each of the plurality of device commands for execution by the respective device based on the predicted effect.

17. The computer-readable medium of claim 13, further comprising instructions to receive the plurality of device commands from one or more graphical user interfaces configured to receive manually-input commands.

18. The computer-readable medium of claim 13, wherein the instructions to receive a plurality of device commands comprise instructions to receive the plurality of device commands, wherein at least one of the plurality of device commands is configured to be executed by a smart meter, customer premise device, switching device, or compensator device.

\* \* \* \* \*